United States Patent
Nagata et al.

(10) Patent No.: US 10,892,921 B2
(45) Date of Patent: Jan. 12, 2021

(54) SEMICONDUCTOR DEVICE AND SYSTEM USING THE SAME

(71) Applicant: Renesas Electronics Corporation, Tokyo (JP)

(72) Inventors: Masahiko Nagata, Tokyo (JP); Chizuru Matsunaga, Tokyo (JP); Tsukasa Yobo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 225 days.

(21) Appl. No.: 16/100,933

(22) Filed: Aug. 10, 2018

(65) Prior Publication Data
US 2019/0132162 A1    May 2, 2019

(30) Foreign Application Priority Data

Oct. 27, 2017    (JP) ................................. 2017-208207

(51) Int. Cl.
| | |
|---|---|
| *H04L 25/03* | (2006.01) |
| *H04L 25/49* | (2006.01) |
| *H04L 9/08* | (2006.01) |
| *G06F 21/72* | (2013.01) |
| *H04L 9/12* | (2006.01) |
| *H04L 9/14* | (2006.01) |
| *H04L 9/06* | (2006.01) |

(52) U.S. Cl.
CPC ........ *H04L 25/03866* (2013.01); *G06F 21/72* (2013.01); *H04L 9/065* (2013.01); *H04L 9/0869* (2013.01); *H04L 9/12* (2013.01); *H04L 9/14* (2013.01); *H04L 25/4908* (2013.01)

(58) Field of Classification Search
CPC ....... H04L 25/03866; H04L 9/12; H04L 9/14; H04L 9/065; H04L 25/4908; H04L 9/0869; G06F 12/0207; G06F 21/72; G06F 12/1408; G06F 2212/1052
See application file for complete search history.

(56) References Cited

U.S. PATENT DOCUMENTS

| | | | | |
|---|---|---|---|---|
| 3,214,206 A | * | 10/1965 | Sullivan ................. | A01F 15/145 289/14 |
| 6,735,697 B1 | * | 5/2004 | Buhr .................... | G06F 12/1408 713/190 |
| 2004/0103360 A1 | * | 5/2004 | Mori ................... | G11B 20/1866 714/768 |

(Continued)

FOREIGN PATENT DOCUMENTS

JP    H09-51312 A    2/1997

*Primary Examiner* — Meng Li
(74) *Attorney, Agent, or Firm* — McDermott Will & Emery LLP

(57) ABSTRACT

The present invention provides a semiconductor device capable of detecting illegal data in secret data communications. A semiconductor device that transmits and receives data includes a specific bit extraction block that extracts first data from transmission data in accordance with a first rule, another specific bit extraction block that extracts second data from reception data in accordance with a second rule, and a bit pattern accumulation buffer that accumulates the first data and the second data. A scramble pattern used when scrambling the transmission data is generated by a combination of the first data and the second data accumulated in the bit pattern accumulation buffer.

11 Claims, 21 Drawing Sheets

(56) References Cited

U.S. PATENT DOCUMENTS

| | | | |
|---|---|---|---|
| 2006/0033646 A1* | 2/2006 | Dreps | H04L 25/03866 341/50 |
| 2009/0201876 A1* | 8/2009 | Morimoto | H04W 72/085 370/330 |
| 2014/0310534 A1* | 10/2014 | Gurgi | G06F 12/1408 713/193 |
| 2017/0187844 A1* | 6/2017 | Bea | H04L 47/35 |
| 2018/0083789 A1* | 3/2018 | Yamamoto | H04L 9/34 |
| 2018/0351771 A1* | 12/2018 | Baek | H04L 25/068 |

* cited by examiner

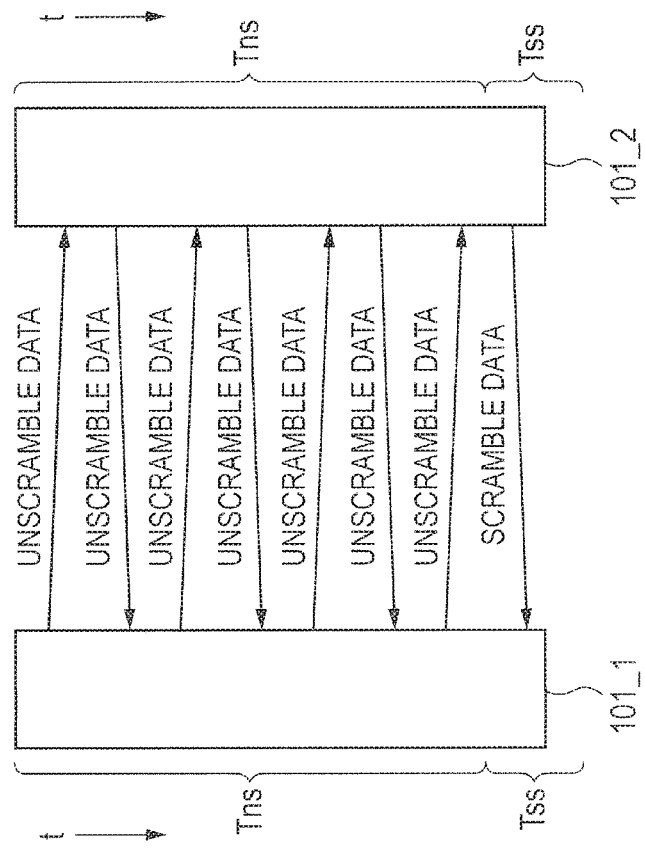
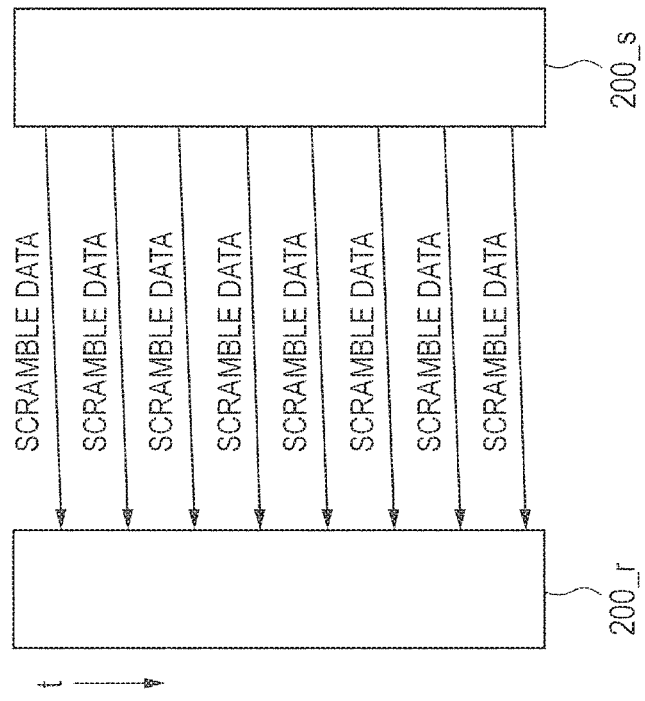

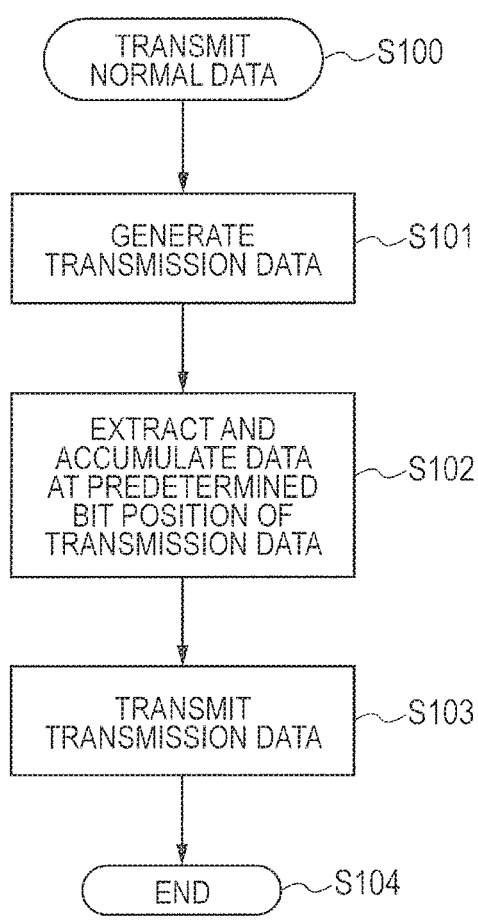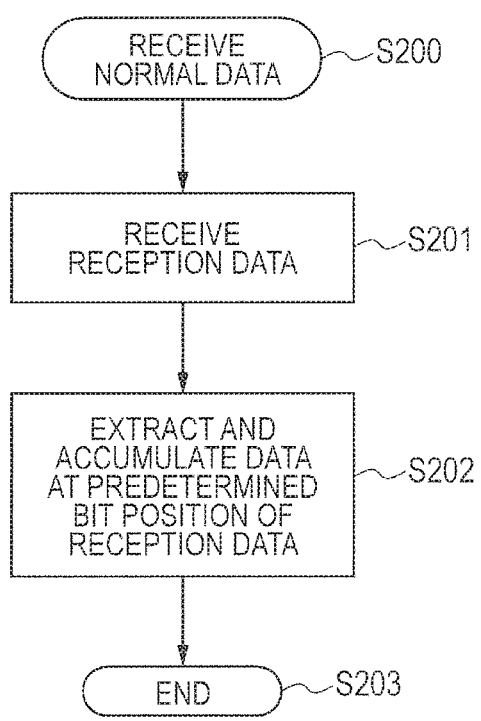
FIG. 6A
FIG. 6B

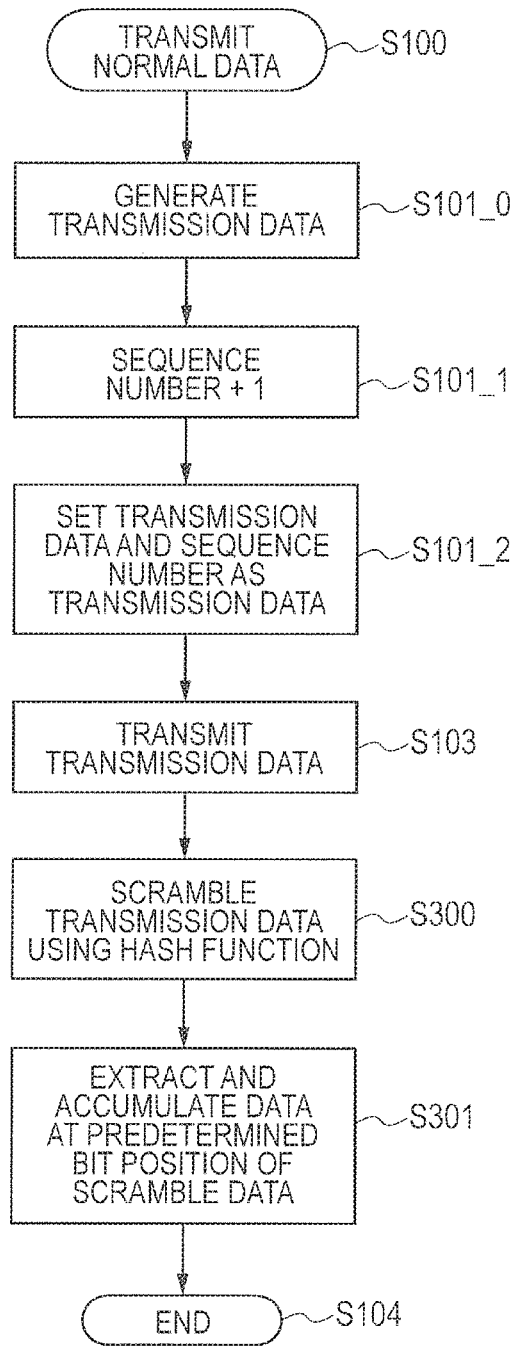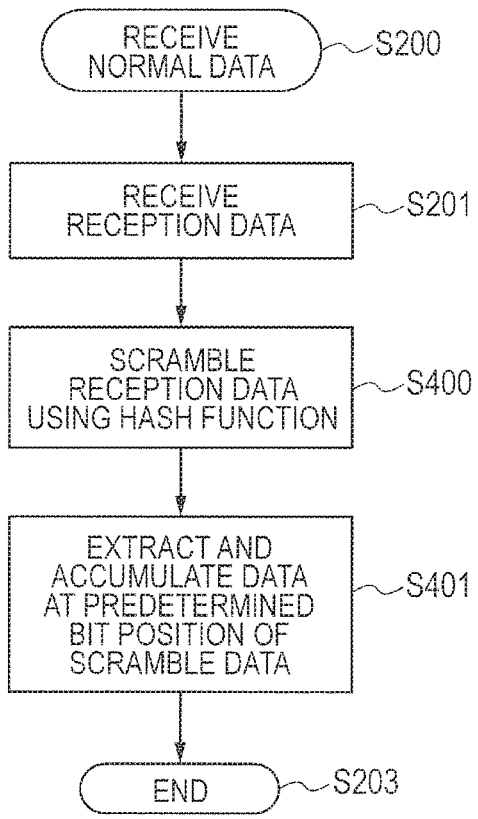
FIG. 10A
FIG. 10B

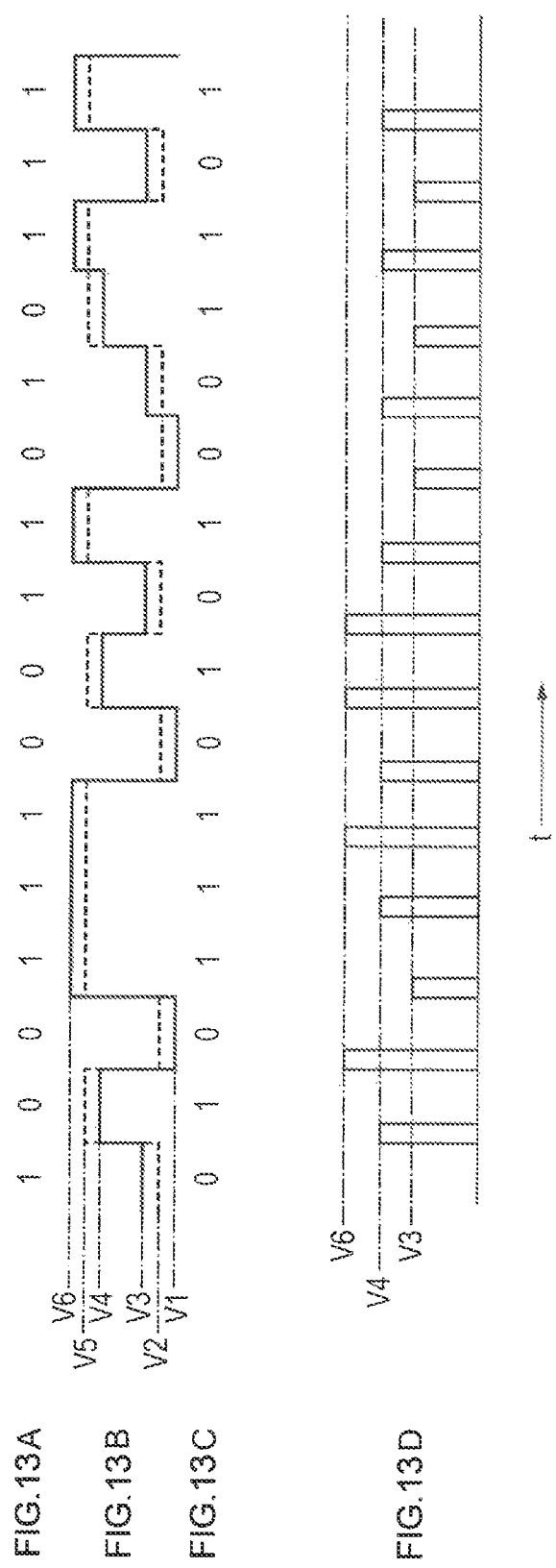

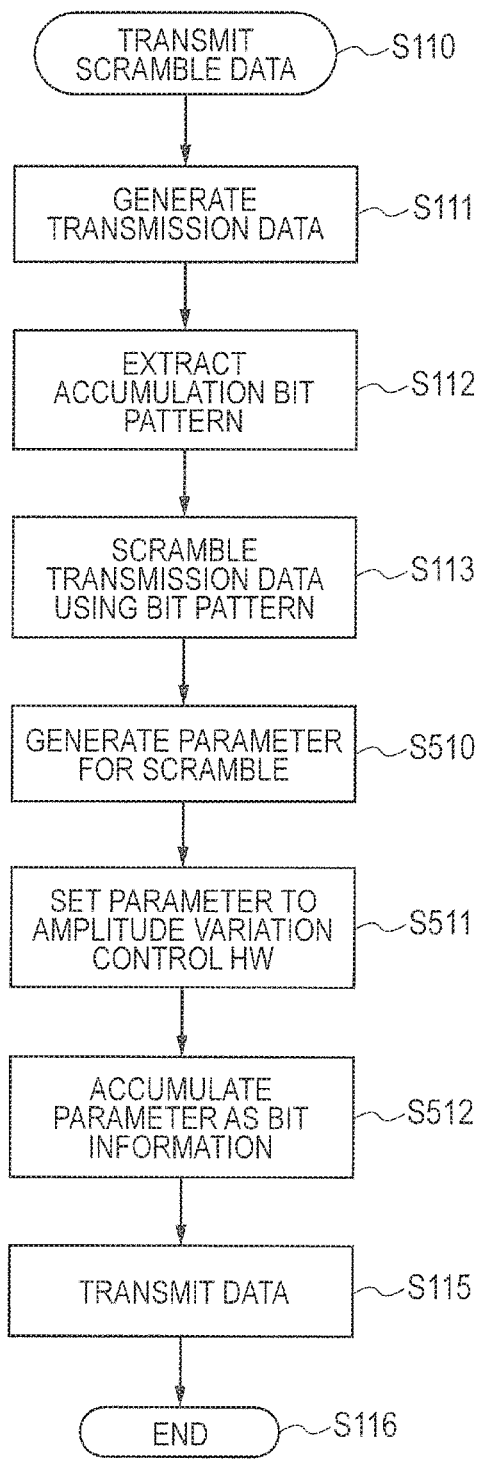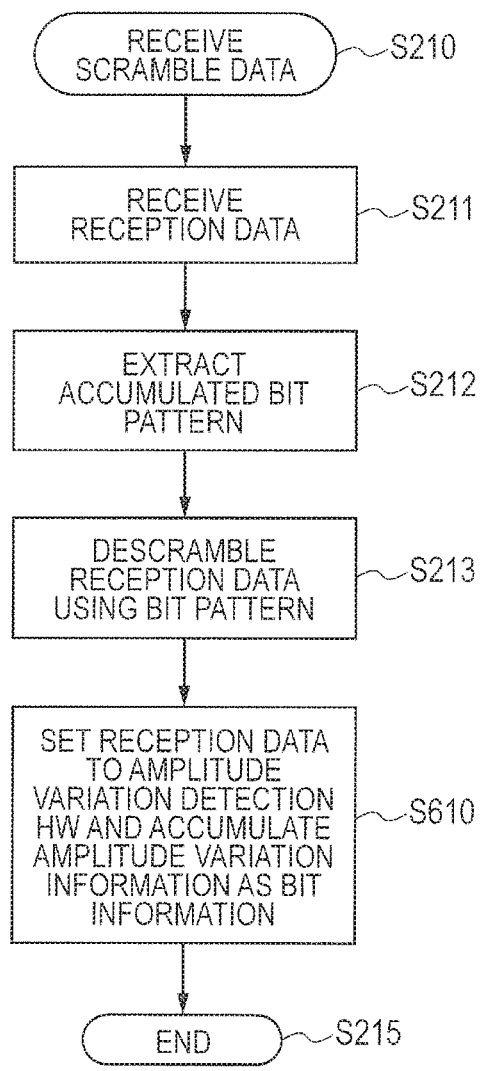

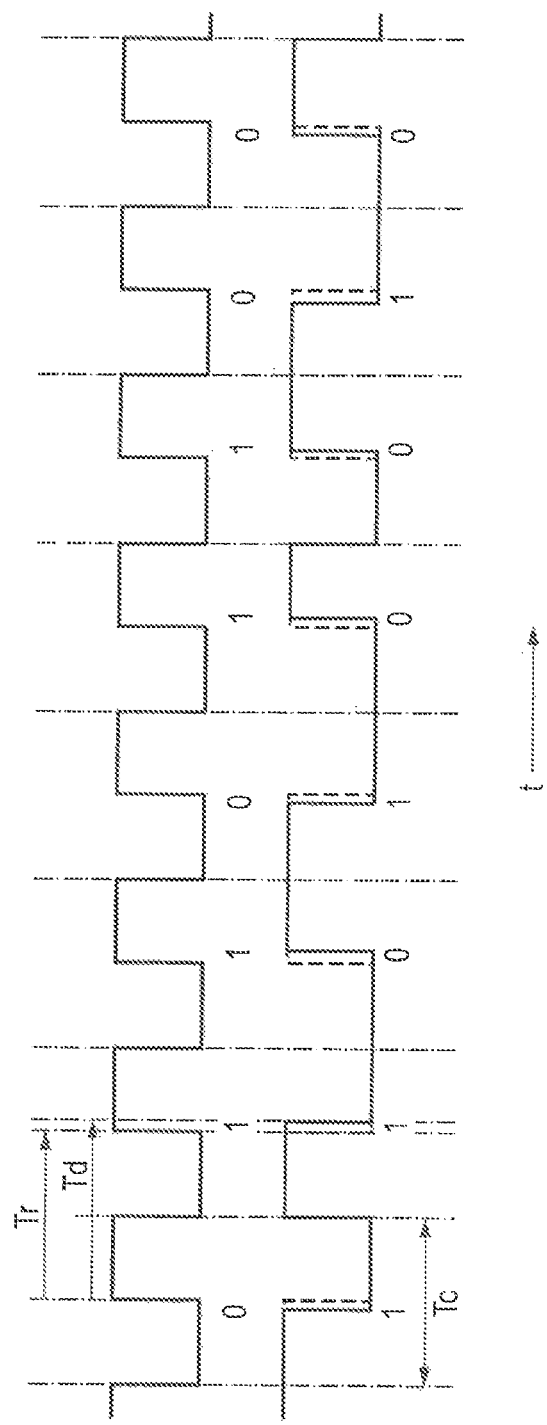

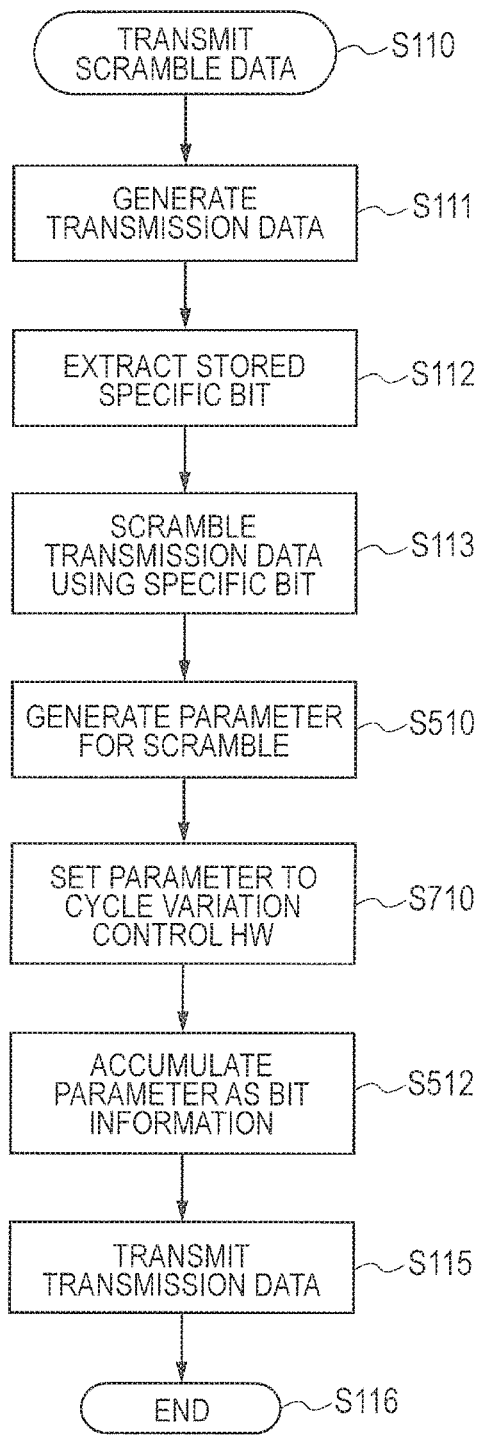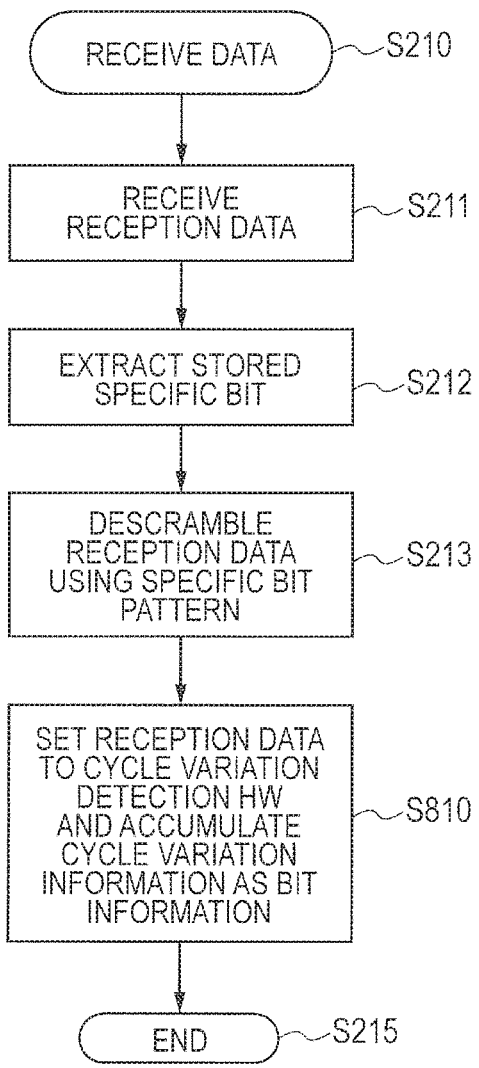
FIG. 19A
FIG. 19B

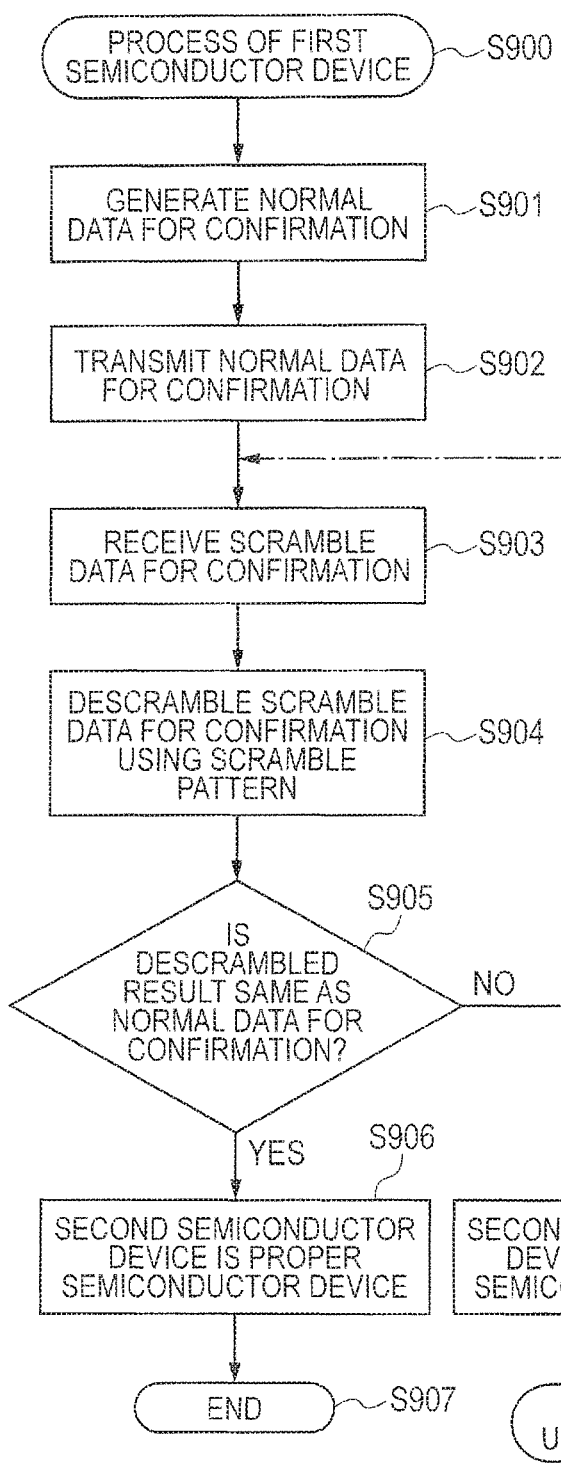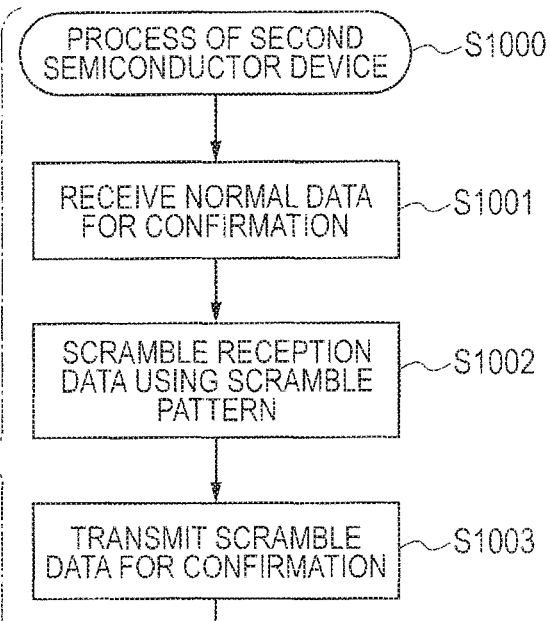
FIG. 21A
FIG. 21B

SEMICONDUCTOR DEVICE AND SYSTEM USING THE SAME

CROSS-REFERENCE TO RELATED APPLICATIONS

The disclosure of Japanese Patent Application No. 2017-208207 filed on Oct. 27, 2017 including the specification, drawings and abstract is incorporated herein by reference in its entirety.

BACKGROUND

The present invention relates to a semiconductor device and a system using the same, and relates to a semiconductor device and a system using the same that can perform, for example, secret data communications.

In order to realize secret data communications, it is conceivable to implement an encryption function generating secret data to be transmitted and received in a semiconductor device. In this case, the encryption function is realized by, for example, executing a complicated process using a public encryption key or the like, and the semiconductor device is required to have a relatively-high processing capability to execute the complicated process.

Further, in the secret data communications, there is a technique of scrambling data using a scramble parameter and transmitting the data. Such a technique is described in, for example, Japanese Unexamined Patent Application Publication No. Hei 9 (1997)-51312.

Japanese Unexamined Patent Application Publication No. Hei 9 (1997)-51312 describes a broadcasting mode in which data is broadcasted by being scrambled using a scramble parameter that is frequently changed and the data is descrambled on the reception side. Japanese Unexamined Patent Application Publication No. Hei 9 (1997)-51312 shows a technique in which data can be descrambled by correctly recognizing the scramble parameter on the reception side without broadcasting special information related to the scramble parameter other than net data to be broadcasted. Namely, in a broadcasting station, a bit string is read from a predetermined position in data to be broadcasted, a scramble parameter is created on the basis of the bit string, and the data is broadcasted by being descrambled using the scramble parameter. On the other hand, on the reception side, a bit string is read from a predetermined position in the received data, a scramble parameter is created on the basis of the bit string, and the reception data is descrambled. Accordingly, data can be correctly descrambled on the reception side without broadcasting special information related to the scramble parameter other than net data.

SUMMARY

As described above, in the case where the encryption function is implemented in the semiconductor device, the semiconductor device is required to have a relatively-high processing capability. Thus, there are problems that the manufacturing cost of the semiconductor device becomes high and the power consumption increases.

Therefore, in the case where the secret data communications are realized between the semiconductor devices in which it is difficult to implement the encryption function, it is conceivable that a scramble parameter (hereinafter, also referred to as a scramble pattern) is exchanged in advance between the semiconductor devices, and data is scrambled using the scramble parameter when transmitting important secret data. In this case, the semiconductor device on the reception side descrambles the data using the scramble pattern exchanged in advance, and decrypts the important data. Since data is encrypted and decrypted by scrambling and descrambling the data using the descramble pattern, the secret data communications can be realized even by a semiconductor device in which it is difficult to implement the encryption function and which is relatively low in the processing capability.

However, if the scramble pattern is transmitted at specific timing in the exchange of the scramble pattern, there is a problem that a person (for example, a malicious third party) who monitors communication lines between the semiconductor devices can easily guess the scramble pattern.

According to Japanese Unexamined Patent Application Publication No. Hei 9 (1997)-51312, it is not necessary to transmit the special information related to the scramble pattern other than net data. However, the inventors found the following problems. Namely, in the technique described in Japanese Unexamined Patent Application Publication No. Hei 9 (1997)-51312, scramble data scrambled using the scramble pattern is unidirectionally transmitted from the broadcasting station towards the reception side. Thus, it is difficult for the reception side to confirm whether or not the received scramble data is correct data. Therefore, the following threat is assumed: even in the case where a malicious third party generates and transmits, for example, falsified scramble data, the reception side needs to execute a process on the assumption that the received scramble data is correct.

The other problems and novel features will become apparent from the description of the specification and the accompanying drawings.

The following is a semiconductor device according to an embodiment.

Namely, a semiconductor device that transmits and receives data includes a scramble unit that scrambles transmission data using a combination of first data on the basis of transmission data to be transmitted and second data on the basis of received reception data as a scramble pattern. The combination of the first data on the basis of the transmission data and the second data on the basis of the reception data is used as the scramble pattern when secret data communications are performed between the semiconductor devices. Therefore, even if an illegal scramble pattern and/or illegal scramble data falsified by a third party are/is transmitted, a semiconductor device on the reception side can detect that the data is illegal data, and even a semiconductor device having no encryption function or a system using the same can prevent an illegal process from being executed.

Further, in a semiconductor device according to an embodiment, first data is accumulated in a buffer every time transmission data is transmitted, and second data is accumulated in the buffer every time reception data is received. A combination of a plurality of pieces of first data and a plurality of pieces of second data accumulated in the buffer is used as a scramble pattern. The scramble pattern is configured using the first data and the second data extracted from the transmission data and the reception data that are temporally dispersed. Since the scramble pattern is configured using the first data and the second data that are temporally dispersed, it is possible to make it more difficult to specify the scramble pattern.

According to an embodiment, it is possible to provide a semiconductor device capable of detecting illegal data in secret data communications.

BRIEF DESCRIPTION OF THE DRAWINGS

FIGS. 2A and 2B are explanation diagrams each explaining data communications in the system according to the first embodiment;

FIGS. 6A and 6B are flowcharts each showing an operation of the semiconductor device according to the first embodiment;

FIGS. 10A and 10B are flowcharts each showing an operation of the semiconductor device according to the second embodiment;

FIGS. 13A to 13D are waveform diagrams each showing the voltage variation of a communication line according to the third embodiment;

FIGS. 15A and 15B are flowcharts each showing an operation of the semiconductor device according to the third embodiment;

FIGS. 17A to 17D are waveform diagrams each explaining the cycle variation of communication data according to the fourth embodiment;

FIGS. 19A and 19B are flowcharts each showing an operation of the semiconductor device according to the fourth embodiment;

FIGS. 21A and 21B are flowcharts each showing a confirmation operation of the system according to the fifth embodiment.

DETAILED DESCRIPTION

Figure 1:
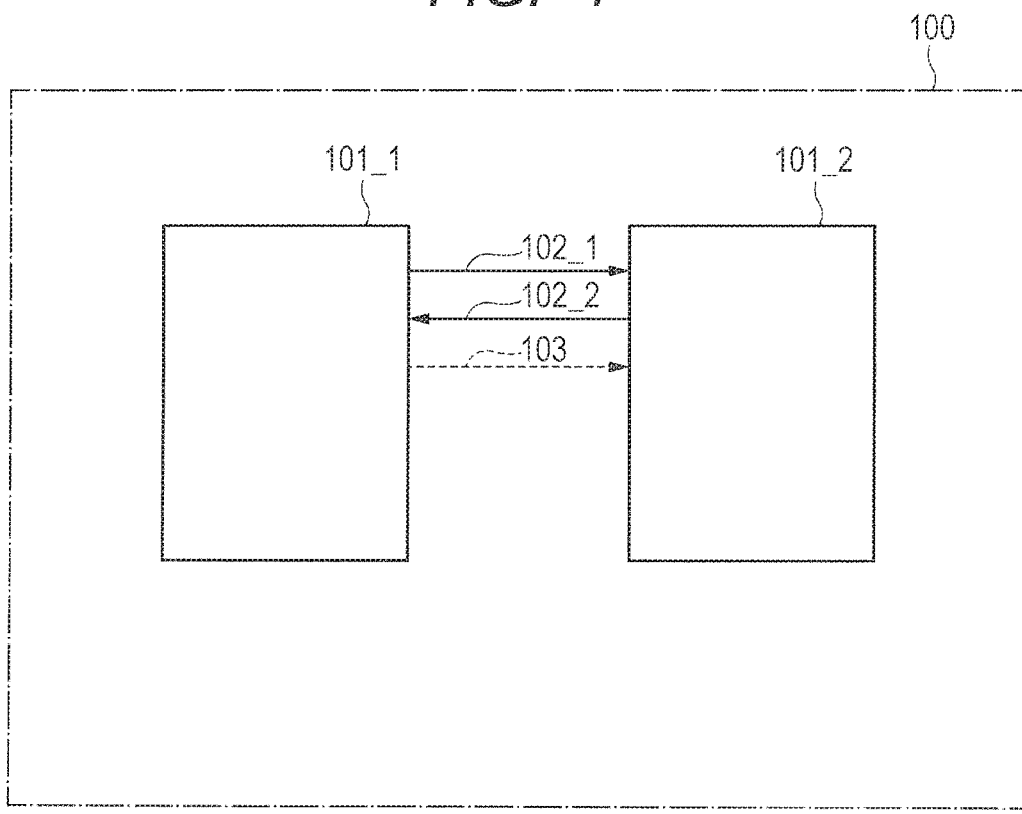
FIG. 1 is a block diagram for showing a configuration of a system according to a first embodiment.

Hereinafter, each embodiment of the present invention will be described with reference to the drawings. It should be noted that the disclosure is only an example, and changes that are appropriately made and can be easily conceived by a person skilled in the art while keeping the gist of the invention are included within the scope of the present invention as a matter of course. Further, the width, thickness, and shape of each unit are schematically shown in the drawings in some cases as compared to an actual mode in order to make the explanation clearer, but are only examples and do not limit the interpretation of the present invention.

Further, the same elements described in the already-presented drawing are followed by the same signs in the specification and the drawings, and the detailed explanation thereof will be appropriately omitted in some cases.

First Embodiment

<System>

First, a system configured using a plurality of semiconductor devices will be described. FIG. 1 is a block diagram for showing a configuration of the system according to a first embodiment. In the drawing, the reference numeral 100 denotes the system. The system 100 includes a plurality of semiconductor devices 101, and a desired function is realized by coupling the semiconductor devices 101 to each other. In order to simplify the explanation, only two semiconductor devices 100_1 and 101_2 are shown in FIG. 1, and the rest of the semiconductor devices 101 are omitted. In order to distinguish the semiconductor device 101_1 from the semiconductor device 101_2, the semiconductor device 101_1 is referred to as a first semiconductor device and the semiconductor device 101_2 is referred to as a second semiconductor device in the following explanation.

In the embodiment, the first semiconductor device 101_1 and the second semiconductor device 101_2 are coupled to each other through a communication line, and data communications are performed between the first semiconductor device 101_1 and the second semiconductor device 101_2. Although not particularly limited, the data communications in the embodiment are performed as serial data communications in which data is serially transmitted and received. In the drawing, the reference numeral 102_1 denotes communication data transmitted from the first semiconductor device 101_1 towards the second semiconductor device 101_2, and the communication data 102_1 is received by the second semiconductor device 101_2. Further, the reference numeral 102_2 denotes communication data transmitted from the second semiconductor device 101_2 towards the first semiconductor device 101_1, and the communication data 102_2 is received by the first semiconductor device 101_1. In the drawing, a broken line 103 denotes a synchronization clock signal. In the embodiment, the first semiconductor device 101_1 outputs the synchronization clock signal 103 to the second semiconductor device 101_2.

Although not particularly limited, the first semiconductor device 101_1 transmits the communication data 102_1 in synchronization with a change in the synchronization clock signal 103, and receives the communication data 102_2 in synchronization with a change in the synchronization clock signal 103. Likewise, the second semiconductor device 101_2 also transmits the communication data 102_2 in synchronization with a change in the synchronization clock signal 103, and receives the communication data 102_1. Namely, the communication data is transmitted and received in a clock synchronous serial communication method. It is obvious that the communication data may be transmitted and received in an asynchronous serial communication method.

The first semiconductor device 101_1 and the second semiconductor device 101_2 may be mounted on one board configuring the system 100, or may be mounted on different boards configuring the system 100. Further, the first semiconductor device 101_1 and the second semiconductor device 101_2 may be regarded as equipment. In the case where the first semiconductor device 101_1 is regarded as equipment and the second semiconductor device 101_2 is regarded as equipment B, data communications are performed between the equipment A and the equipment B configuring the system.

Although not particularly limited, communication data related to a battery is transmitted and received between the first semiconductor device 101_1 and the second semiconductor device 101_2. In this case, for example, authentication data or the like indicating whether or not a battery is a regular battery is transmitted and received as secret communication data between the first semiconductor device 101_1 and the second semiconductor device 101_2. It is obvious that not only the authentication data but also other data related to a battery is transmitted and received.

<Data Communications in System>

FIGS. 2A-2B are explanation diagrams each explaining data communications in the system according to the first embodiment. FIG. 2A shows data communications in which scramble data is unidirectionally transmitted from a broadcasting station (transmitter) 200_s towards a reception side (receiver) 200_r as described in Japanese Unexamined Patent Application Publication No. Hei 9 (1997)-51312. On the other hand, FIG. 2B shows data communications conducted by the system 100 according to the embodiment. In each of FIGS. 2A and 2B, "t" represents time, and time t elapses from the upper side towards the lower side.

The transmitter 200_r scrambles communication data to be transmitted using a scramble pattern to form scrambled (encrypted) scramble data, and sequentially transmits the data to the receiver 200_r at, for example, predetermined time intervals. The receiver 200_r descrambles (decrypts) the sequentially-received scramble data using the scramble pattern.

In the system 100 according to the embodiment, as shown in FIG. 2B, bidirectional data communications are performed between the first semiconductor device 101_1 and the second semiconductor device 101_2. In FIG. 2B, data communications are performed between the first semiconductor device 101_1 and the second semiconductor device 101_2 in a period Tns. In the period Tns, the communication data 102_1 and 102_2 (see FIG. 1) transmitted and received between the first semiconductor device 101_1 and the second semiconductor device 101_2 are not scrambled, and transmission and reception of the communication data that need not be concealed are performed. Since transmission and reception of the unscramble communication data (unscramble data) 102_1 and 102_2 that are not scrambled are performed, the period Tns is also referred to as an unscramble communication period.

In the case where it is necessary to conceal the communication data after the unscramble communication period Tns, the period is shifted to a scramble communication period Tss. The data to be transmitted and received between the first semiconductor device 101_1 and the second semiconductor device 101_2 is scrambled, and the scramble data is transmitted and received as the communication data 102_1 and 102_2.

If the viewpoint is changed, the data communication periods in the system 100 according to the embodiment can be regarded as including the unscramble communication period Tns and the scramble communication period Tss. Further, the scramble communication period Tss can be regarded as a period in which secret data communications are performed.

In the scramble communication period Tss, the scramble data may be unidirectionally transmitted from one semiconductor device (101_2) towards the other semiconductor device (101_1) as shown in FIG. 2B. However, the scramble data may be bi-directionally transmitted. As will be described later, the bidirectional transmission of the scramble data is more desirable even in the scramble communication period Tss in order to improve the secrecy. Further, transmission and reception of the communication data 102_1 and 102_2 are performed a plurality of times in the unscramble communication period Tns as shown in FIG. 2B.

<Configurations of First Semiconductor Device and Second Semiconductor Device>

Next, configurations of the first semiconductor device 101_1 and the second semiconductor device 101_2 will be described. Each of the first semiconductor device 101_1 and the second semiconductor device 101_2 includes a plurality of functional modules, and is configured so as to achieve a desired function by combining the functional modules. Although not particularly limited, the function achieved by the first semiconductor device 101_1 is different from that achieved by the second semiconductor device 101_2. Therefore, the functional modules included in the first semiconductor device 101_1 are slightly different from those included in the second semiconductor device 101_2. However, the configurations of the data communication functional modules providing the function of data communications are the same in the first semiconductor device 101_1 and the second semiconductor device 101_2.

Figure 3:
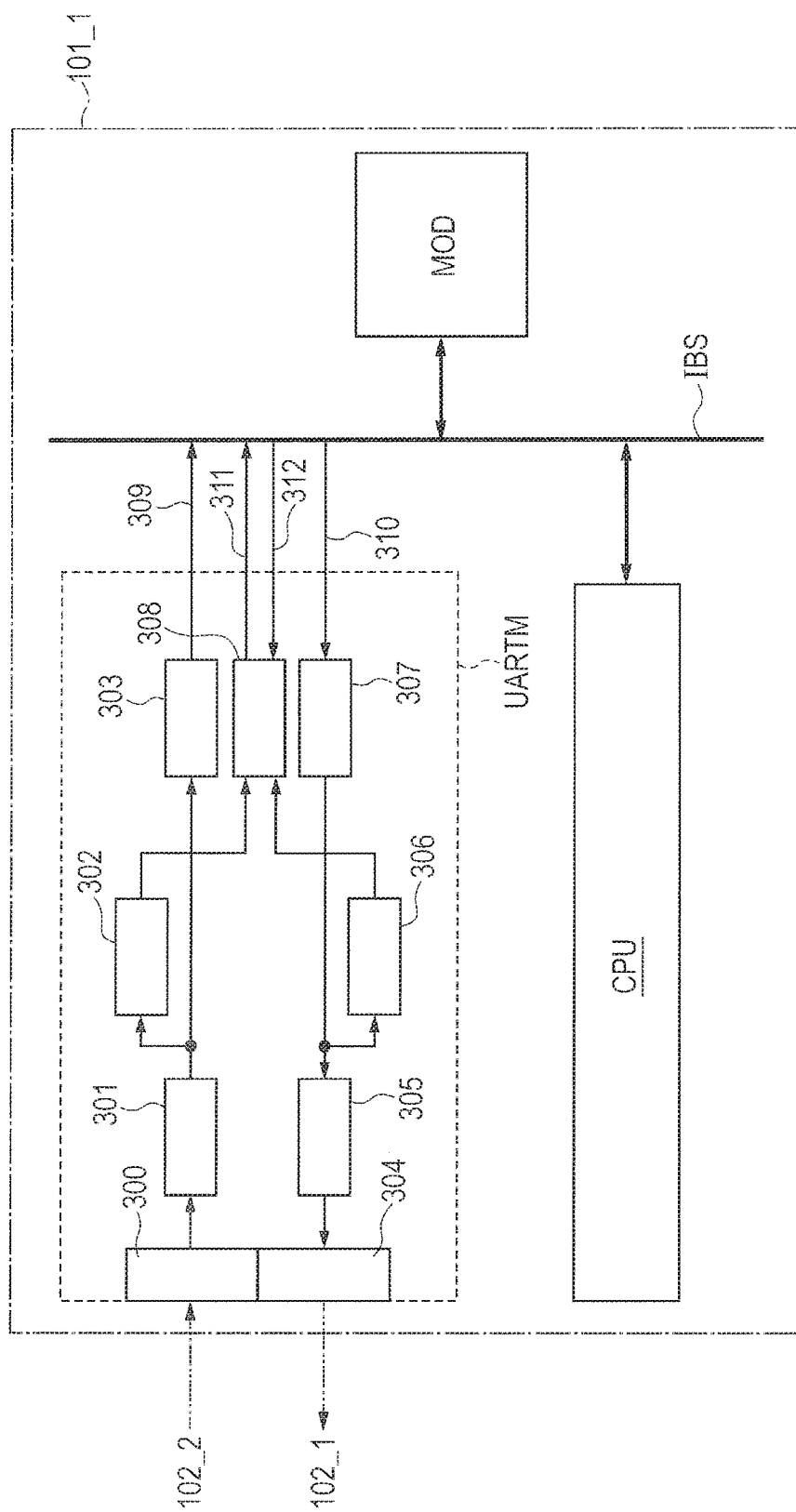
FIG. 3 is a block diagram for showing a configuration of a semiconductor device according to the first embodiment.

FIG. 3 is a block diagram for showing a configuration of the semiconductor device according to the embodiment. In the drawing, a configuration of the first semiconductor device 101_1 is shown. In order to avoid complexity of the drawing, the drawing shows two functional modules and a microprocessor (hereinafter, simply referred to as a processor). In the drawing, UARTM denotes a data communication functional module, MOD denotes another functional module different from the data communication functional module, and CPU denotes a processor. The processor CPU, the data communication functional module UARTM, and the functional module MOD are coupled to each other through an internal bus IBS. Data is transmitted and received among the data communication functional module UARTM, the functional module MOD, and the processor CPU through the internal bus IBS, and the data communication functional module UARTM and the functional module MOD are operated in accordance with an instruction of the processor CPU.

As similar to the first semiconductor device 101_1, the second semiconductor device 101_2 also includes a data communication functional module UARTM, a functional module MOD, and a processor. In the first semiconductor device 101_1 and the second semiconductor device 101_2, the configurations of the data communication functional modules UARTM are the same as described above. On the contrary, the configurations of the processors CPU and the functional modules MOD may be the same or different from each other in the first semiconductor device 101_1 and the second semiconductor device 101_2.

<<Data Communication Functional Module>>

Next, the configuration of the data communication functional module UARTM will be described. Since the configurations of the data communication functional modules are the same in the first semiconductor device 101_1 and the second semiconductor device 101_2, the first semiconductor device 101_1 will be described as a representative example. In FIG. 3, the reference numerals 102_1 and 102_2 denote the communication data described in FIG. 1. In FIG. 3, the reference numeral 300 denotes a reception port, 301 denotes a reception block, 302 denotes a specific bit extraction block (hereinafter, also referred to as a second extraction block or a second specific bit extraction block), and 303 denotes a reception buffer. The communication data 102_2 supplied to the reception port 300 is supplied from the reception port 300 to the reception block 301 as reception data. The reception data supplied to the reception block 301 is supplied to both of the reception buffer 303 and the specific bit extraction block 302. The reception data supplied to the reception buffer 303 is supplied from the reception buffer 303 to the internal bus IBS as reception data 309.

On the other hand, data (bit information) at a specific bit position is extracted from the reception data supplied to the specific bit extraction block 302 by the specific bit extraction block 302, and the extracted data at the specific bit position is supplied to a bit pattern accumulation buffer 308 as second data. The specific bit extraction block 302 will be described later in detail, and thus the explanation thereof is omitted here.

In FIG. 3, the reference numeral 304 denotes a transmission port, 305 denotes a transmission block, 306 denotes a specific bit extraction block (hereinafter, also referred to as a first extraction block or a first specific bit extraction block), and 307 denotes a transmission buffer. Transmission data 310 to be transmitted is supplied from the internal bus IBS to the transmission buffer 307. The transmission data supplied to the transmission buffer 307 is supplied from the transmission buffer 307 to both of the transmission block 305 and the specific bit extraction block 306. The transmission data supplied to the transmission block 305 is output to the transmission port 304, and is transmitted from the transmission port 304 as the communication data 102_1.

On the other hand, data (bit information) at a specific bit position is extracted from the transmission data supplied to the specific bit extraction block 306 by the specific bit extraction block 306, and the extracted data at the specific bit position is supplied to the bit pattern accumulation buffer 308 as first data. The specific bit extraction block 306 will be described later in detail, and thus the explanation thereof is omitted here.

The bit pattern accumulation buffer 308 sequentially accumulates the second data at the specific bit position extracted by the specific bit extraction block 302 and the first data at the specific bit position extracted by the specific bit extraction block 306. The scramble pattern is generated by combing the accumulated plural pieces of first data with the accumulated plural pieces of second data. The bit pattern accumulation buffer 308 outputs the generated scramble pattern to the internal bus IBS as a scramble pattern 311 in response to a scramble pattern generation timing signal 312.

In the embodiment, although not particularly limited, the processor CPU generates the transmission data 310 to be transmitted, and supplies the same to the data communication functional module UARTM through the internal bus IBS. Further, the processor CPU receives the reception data 309 from the data communication functional module UARTM through the internal bus IBS, and executes a predetermined process for the reception data 309. Further, the scramble pattern 311 is supplied from the bit pattern accumulation buffer 308 to the processor CPU through the internal bus IBS.

In the case where the transmission data is concealed, the processor CPU scrambles the transmission data using the scramble pattern 311 supplied from the bit pattern accumulation buffer 308. The scramble data generated by the scrambling is supplied to the transmission buffer 307 as the transmission data 310. Further, in the case where the reception data is the scramble data, the processor CPU descrambles the reception data 309 using the scramble pattern 311 supplied from the bit pattern accumulation buffer 308 to generate unencrypted reception data, and executes a predetermined process for the unencrypted reception data. The scramble (descramble) is realized by, for example, carrying out an exclusive logical operation between the transmission data (scramble data) and the scramble pattern.

<<Specific Bit Extraction Block>>

Figure 4:
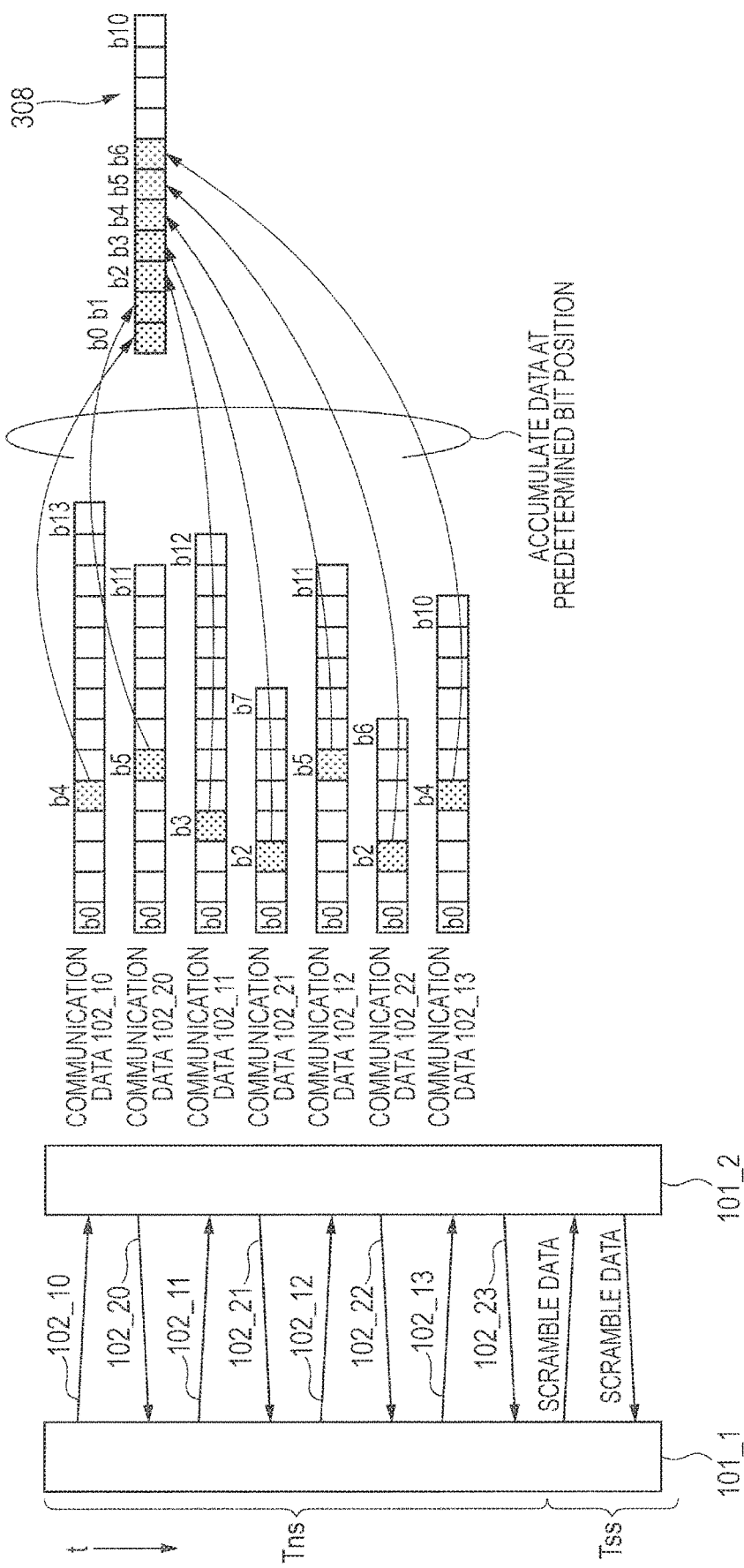
FIG. 4 is a schematic explanation diagram for explaining operations of specific bit extraction blocks according to the first embodiment.

Next, operations of the specific bit extraction blocks 302 and 306 and the bit pattern accumulation buffer 308 will be described. FIG. 4 is a schematic explanation diagram for explaining the operations of the specific bit extraction blocks 302 and 306 according to the first embodiment. Here, as similar to FIG. 2B, a case in which the communication data is alternately transmitted and received between the first semiconductor device 101_1 and the second semiconductor device 101_2 and the scramble pattern is generated on the basis of the communication data to be transmitted and the received communication data in the unscramble communication period Tns will be described.

In the first semiconductor device 101_1 and the second semiconductor device 101_2, the specific bit extraction blocks 302 and 306 extract the data at the predetermined bit positions of the communication data in accordance with the preliminarily-set rules (a first rule and a second rule), and supply the same to the bit pattern accumulation buffer 308 as the second data and the first data.

It is assumed in the embodiment that the specific bit extraction block 306 in the first semiconductor device 101_1 and the specific bit extraction block 302 in the second semiconductor device 101_2 extract the data of the same predetermined bit position in accordance with the same rule (the first rule). Further, it is assumed that the specific bit extraction block 306 in the second semiconductor device 101_2 and the specific bit extraction block 302 in the first semiconductor device 101_1 extract the data of the same predetermined bit position in accordance with the same rule (the second rule). Further, it is assumed in the first semiconductor device 101_1 that the data related to the transmission data extracted by the specific bit extraction block 306 is supplied to the bit pattern accumulation buffer 308 earlier than the data related to the reception data extracted by the specific bit extraction block 302. On the other hand, it is assumed in the second semiconductor device 101_2 that the data related to the reception data extracted by the specific bit extraction block 302 is supplied to the bit pattern accumulation buffer 308 earlier than the data related to the transmission data extracted by the specific bit extraction block 306.

In the rule (the first rule) followed by the specific bit extraction block 306 in the first semiconductor device 101_1 and the specific bit extraction block 302 in the second semiconductor device 101_2, data (bit information) at the bit position b4 of the fourth bit, the bit position b3 of the third bit, the bit position b5 of the fifth bit, and the bit position b4 of the fourth bit in the communication data 102_10, 102_11, 102_12, and 102_13 sequentially transmitted and received is sequentially extracted. On the other hand, in the rule (the second rule) followed by the specific bit extraction block 306 in the second semiconductor device 101_2 and the specific bit extraction block 302 in the first semiconductor device 101_1, data (bit information) at the bit position b5 of the fifth bit, the bit position b2 of the second bit, and the bit position b2 of the second bit in the communication data 102_20, 102_21, and 102_22 sequentially transmitted and received is sequentially extracted.

It should be noted that in the drawing, the communication data has a variable bit length so that the communication data starts from the bit position b0 of the 0-th bit, and the bit position of the last bit of the communication data differs depending on the communication data. It is obvious that the communication data may be serial data having a fixed length so that the communication data starts from the 0-th bit and the length is the same.

When the first semiconductor device 101_1 transmits the first communication data 102_10 in the unscramble communication period Tns in accordance with the above-described rule, the specific bit extraction block 306 in the first semiconductor device 101_1 extracts data at the bit position b4 in the communication data 102_10, and supplies the same to the bit position b0 of the 0-th bit of the bit pattern accumulation buffer 308 to accumulate the extracted data at the bit position b0.

When receiving the first communication data 102_10 in the second semiconductor device 101_2, the specific bit extraction block 302 extracts the data at the bit position b4 in the communication data 102_10, and supplies the same to the bit position b0 of the 0-th bit of the bit pattern accumulation buffer 308 to accumulate the extracted data at the bit position b0.

Next, when the second semiconductor device 101_2 transmits the second communication data 102_20, the specific bit extraction block 306 in the second semiconductor device 101_2 extracts data at the bit position b5 in the communication data 102_20, and supplies the same to the bit position b1 of the first bit of the bit pattern accumulation buffer 308 to accumulate the extracted data at the bit position b1.

When the first semiconductor device receives the second communication data 102_20, the specific bit extraction block 302 extracts the data at the bit position b5 in the communication data 102_20, and supplies the same to the bit position b1 of the first bit of the bit pattern accumulation buffer 308 to accumulate the extracted data at the bit position b1.

Likewise, when transmission and reception of the seventh communication data 102_13 are completed thereafter, data at the predetermined bit position in each of the third communication data 102_11 to the seventh communication data 102_13 is sequentially accumulated at the bit position b2 of the second bit to the bit position b6 of the sixth bit of the bit pattern accumulation buffer 308. Accordingly, the bit pattern represented by the data accumulated at the bit position b0 of the 0-th bit to the bit position b6 of the sixth bit in the bit pattern accumulation buffer 308 of the first semiconductor device 101_1 becomes the same as the bit pattern represented by the data accumulated at the bit position b0 of the 0-th bit to the bit position b6 of the sixth bit in the bit pattern accumulation buffer 308 of the second semiconductor device 101_2.

Namely, if the above-described rules are preliminarily set between the first semiconductor device 101_1 and the second semiconductor device 101_2, the bit patterns generated by combining the data extracted from each of the predetermined bit positions of the transmission data with the data extracted from each of the predetermined bit positions of the reception data become the same in the first semiconductor device 101_1 and second semiconductor device 101_2.

In the embodiment, the bit pattern accumulated in the bit pattern accumulation buffer 308 is used as the scramble pattern 311. Namely, in the case where the first semiconductor device 101_1 or the second semiconductor device 101_2 transmits the communication data in the scramble communication period Tss, the data is scrambled using the bit pattern to generate the transmission data. On the other hand, the second semiconductor device 101_2 or the first semiconductor device 101_1 having received the scramble data descrambles the data using the bit pattern.

FIG. 4 shows an example in which the bit positions b0 to b6 of the bit pattern accumulation buffer 308 are used to generate the bit pattern. However, the present invention is not limited to this. Namely, bit values at the predetermined bit positions of the communication data may be accumulated at all the bit positions b0 to b10 included in the bit pattern accumulation buffer 308. Thereby, the scramble pattern can be made more complicated, and the secrecy can be improved.

Further, in the embodiment, the data configuring the scramble pattern is extracted from the communication data transmitted and received a plurality of times such as the first communication data 102_10 to sixth communication data 102_13. Namely, the data configuring the scramble pattern is extracted while being temporally dispersed, and thus the secrecy can be further improved.

In addition, in the embodiment, the data is combined with each other by being alternately extracted from the communication data to be transmitted and the received communication data. However, the present invention is not limited to this. For example, the data is continuously extracted from the communication data to be transmitted, the data is continuously extracted from the communication data received thereafter, and the continuously-extracted data may be combined with each other.

In FIG. 4, the specific bit extraction block 306 in the first semiconductor device 101_1 and the specific bit extraction block 302 in the second semiconductor device 101_2 extract the data at the same predetermined bit position in accordance with the same rule. Further, the specific bit extraction block 306 in the second semiconductor device 101_2 and the specific bit extraction block 302 in the first semiconductor device 101_1 extract the data at the same predetermined bit position in accordance with the same rule. However, the present invention is not limited to this. For example, all the specific bit extraction blocks may extract the data at the same predetermined bit position in accordance with the same rule.

<<Bit Pattern Accumulation Buffer>>

FIG. 4 describes an example in which the scramble pattern is generated on the basis of the communication data transmitted and received in the unscramble communication period Tns. However, the present invention is not limited to this. Here, an example in which the scramble pattern is generated on the basis of the scramble data bi-directionally transmitted and received even in the scramble communication period Tss will be described. As described above, the secrecy can be further improved by generating the scramble pattern even in the scramble communication period Tss.

Figure 5:
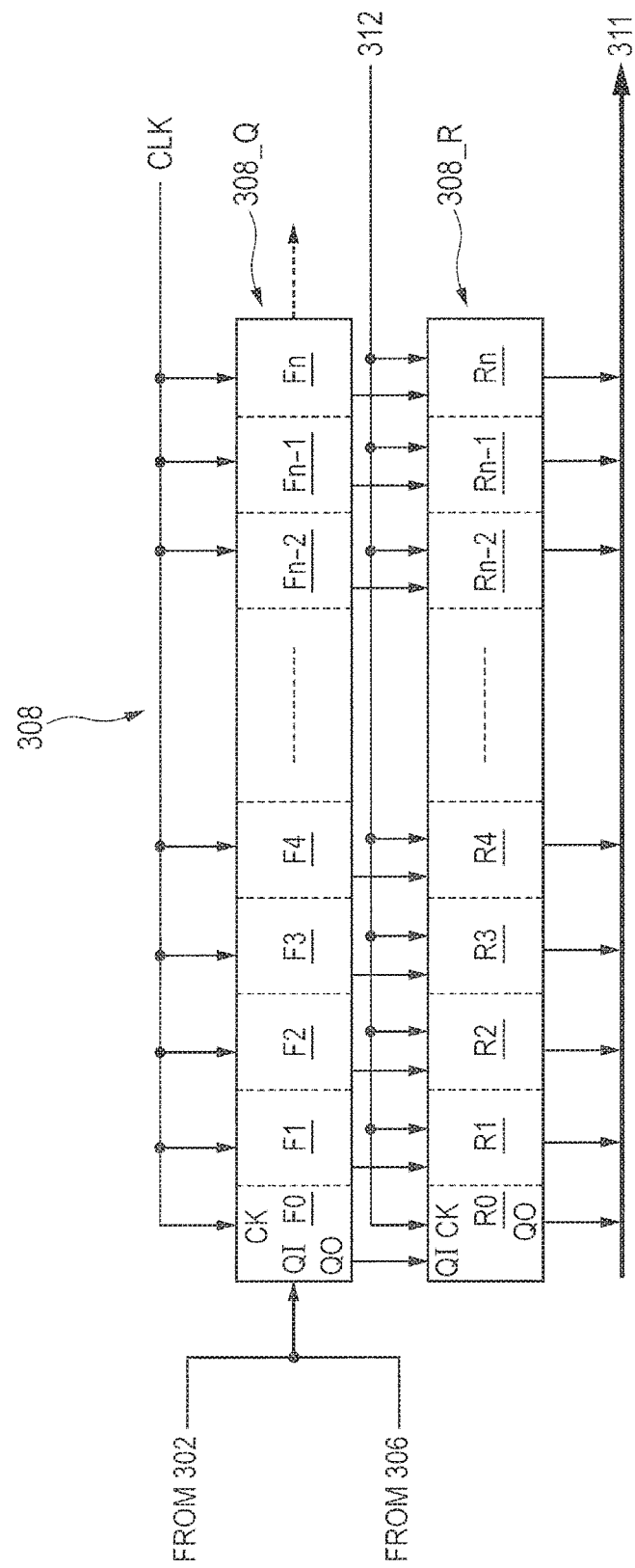
FIG. 5 is a block diagram for showing a configuration of a bit pattern accumulation buffer according to the first embodiment.

In order to generate the scramble pattern from the communication data transmitted and received in both of the unscramble communication period Tns and the scramble communication period Tss, the configuration of the bit pattern accumulation buffer 308 shown in FIG. 4 is changed to that shown in FIG. 5.

FIG. 5 is a block diagram for showing a configuration of the bit pattern accumulation buffer 308 according to the first embodiment. The bit pattern accumulation buffer 308 shown in FIG. 5 is configured using a queue circuit 308_Q and a register 308_R. The queue circuit 308_R and the register 308_R will be described later in detail. The following is an outline of the operation of the bit pattern accumulation buffer 308 in FIG. 5.

The data at the predetermined bit position output from each of the specific bit extraction blocks 302 and 306 is always accumulated in the queue circuit 308_Q. When the pieces of data the number of which exceeds a predetermined number are supplied to the queue circuit 308_Q, the previously-supplied data is sequentially discarded. At the timing shifted from the unscramble communication period Tns to the scramble communication period Tss, the bit pattern accumulated in the queue circuit 308_Q is stored into the register 308_R. The bit pattern stored in the register 308_R is used as the scramble pattern 311. Accordingly, the scramble pattern can be generated by using the data at the predetermined bit position of the communication data transmitted and received in both of the unscramble communication period Tns and the scramble communication period Tss, and the secrecy can be further enhanced.

The queue circuit 308_Q includes a shift register configured using a plurality of flip-flop circuits F0 to Fn whose input nodes QI and output nodes QO are coupled to each other. The data extracted by the specific bit extraction blocks 302 and 306 is supplied to the input node QI of the flip-flop circuit F0 in the first stage of the shift register. Further, the output nodes QO of the flip-flop circuits F0 to Fn are coupled to corresponding input nodes QI of flip-flop circuits R0 to Rn configuring the register 308_R.

A clock signal CLK is supplied to clock signal nodes CK of the flip-flop circuits F0 to Fn in common. In synchronization with a change in the clock signal CLK, the flip-flop circuits F0 to Fn fetch the data supplied to the input nodes QI, and output the same from the output nodes QO. Although not particularly limited, the clock signal CLK is changed in accordance with transmission and reception of the communication data. Accordingly, the data extracted by the specific bit extraction blocks 302 and 306 moves within the shift register in synchronization with transmission and reception of the communication data. The data reaching the flip-flop circuit Fn that is the final stage of the shift register is discarded when the clock signal CLK is changed.

The input nodes QI of the flip-flop circuits R0 to Rn configuring the register 308_R are coupled to the output nodes QO of the corresponding flip-flop circuits F0 to Fn. The scramble pattern generation timing signal 312 is supplied to the clock signal nodes CK of the flip-flop circuits R0 to Rn. When the scramble pattern generation timing signal 312 is changed, the data supplied to the input nodes QI of the corresponding flip-flop circuits F0 to Fn is fetched and output from the output nodes QO. The output of the register 308_R corresponds to the above-described scramble pattern 311.

With the above-described configuration, the data at the predetermined bit position in the communication data is accumulated in the queue circuit 308_Q every time the communication data is transmitted and received, and then is sequentially shifted. Further, in the case where the pieces of communication data the number of which exceeds the number (n+1) of stages of the shift register are transmitted and received, the previous (past) data is sequentially discarded. Since the scramble pattern generation timing signal 312 is changed at the timing shifted to the scramble communication period Tss, the bit pattern accumulated in the queue circuit 308_Q is copied to the register 308_R at the timing, and is output as the scramble pattern 311.

The shift from the unscramble communication period Tns to the scramble communication period Tss is determined on the basis of an application that allows the first semiconductor device 101_1 and the second semiconductor device 101_2 to operate. Therefore, the timing when the scramble pattern generation timing signal 312 is changed can be determined on the basis of an application. Alternatively, the shift may be specified by a command (shift command). In this case, the processor CPU executes the shift command, and thus, for example, the processor CPU may change the scramble pattern generation timing signal 312.

It should be noted that FIG. 5 shows the input nodes QI, the output nodes QO, and the clock signal nodes CK only for the flip-flop circuits F0 and R0 in order to avoid complexity of the drawing. However, the same applies to the other flip-flop circuits F1 to Fn and R1 to Rn.

<Operation of Data Communications>

Figure 7A:
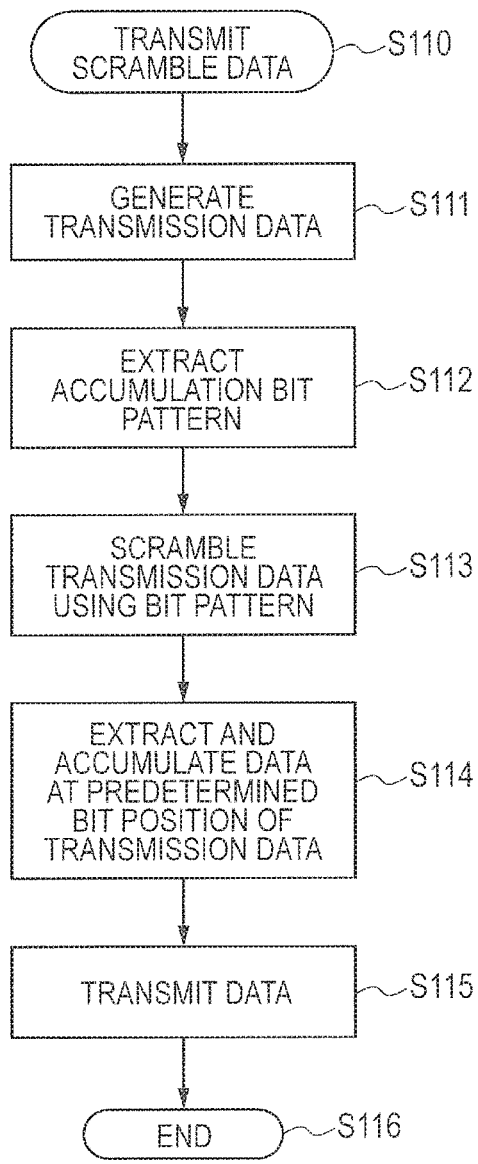
FIGS. 7A and 7B are flowcharts each showing an operation of the semiconductor device according to the first embodiment.
Figure 7B:
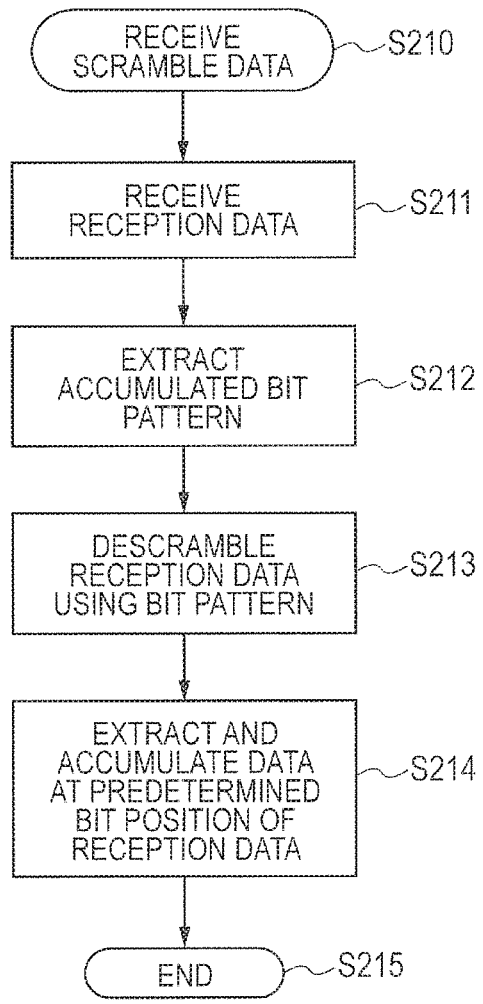

Next, an operation of the first semiconductor device 101_1 in data communications will be described. Here, although an operation of the first semiconductor device 101_1 will be described, an operation of the second semiconductor device 101_2 is the same. FIGS. 6A-6B and FIGS. 7A-7B are flowcharts each showing an operation of the first semiconductor device 101_1 according to the first embodiment. Here, FIGS. 6A-6B show an operation in the unscramble communication period Tns, and FIGS. 7A-7B show an operation in the scramble communication period Tss. It should be noted that the communication data transmitted and received in the unscramble communication period Tns is illustrated as normal data, and the communication data transmitted and received in the scramble communication period Tss is illustrated as scramble data.

FIG. 6A shows a case in which the first semiconductor device 101_1 transmits the normal data. In Step S100, transmission of the normal data is started. In Step S101, for example, the transmission data to be transmitted by the processor CPU is generated. The generated transmission data is supplied to the transmission buffer 307 as the transmission data 310 (FIG. 3). The transmission data supplied to the transmission buffer 307 is supplied to the specific bit extraction block 306 and the transmission block 305. In Step S102, the specific bit extraction block 306 extracts the data at the predetermined bit position of the transmission data in accordance with the rule, and supplies the same to the bit pattern accumulation buffer 308 to be accumulated, as described in FIG. 4. Further, the transmission block 305 transmits the supplied transmission data through the transmission port 304 in Step S103, and the transmission of one normal data is completed in Step S104.

On the other hand, FIG. 6B shows a case in which the first semiconductor device 101_1 receives the normal data. In Step S200, reception of the normal data is started. In Step S201, the reception block 301 receives the reception data through the reception port 300. When the reception data is supplied from the reception block 301 to the specific bit extraction block 302, the specific bit extraction block 302 extracts the data at the predetermined bit position of the reception data in accordance with the rule, and supplies the same to the bit pattern accumulation buffer 308 to be accumulated in Step S202, as described in FIG. 4. Further, although not shown in the drawing, the reception data is supplied from the reception block 301 to the reception buffer 303, and is supplied to the processor CPU as the reception data 309. Thereafter, the reception of one normal data is completed in Step S203.

In the unscramble communication period Tns, the operations described in FIGS. 6A and 6B are alternately performed a plurality of times. Accordingly, the scramble pattern obtained by combining the pieces of data extracted from the pieces of transmission data with the pieces of data extracted from the pieces of reception data is accumulated in the bit pattern accumulation buffer 308.

Next, an operation in the scramble communication period Tss will be described using FIGS. 7A and 7B. Here, FIG. 7A shows a case in which the first semiconductor device 101_1 transmits the scramble data, and FIG. 7B shows a case in which the first semiconductor device 101_1 receives the scramble data. Further, FIG. 7 will be described on the assumption that the bit pattern accumulation buffer 308 includes the configuration described in FIG. 5.

In Step S110 of FIG. 7A, the first semiconductor device 101_1 starts transmission of the scramble data. In Step S111, the transmission data to be transmitted by the processor CPU is generated. Next, in Step S112, the bit pattern (scramble pattern 311) accumulated in the bit pattern accumulation buffer 308 is extracted, and the transmission data is scrambled using the extracted bit pattern in Step S113. Although not particularly limited, Step S112 and Step S113 are executed by the processor CPU. Namely, the transmission data is scrambled in such a manner that the processor CPU reads the scramble pattern 311 from the bit pattern accumulation buffer 308 in Step S112, and executes a predetermined operation between the transmission data and the scramble pattern in Step S113.

The scramble data scrambled in Step S113 is supplied to the transmission buffer 307 as the transmission data 310. The scramble data supplied to the transmission buffer 307 is supplied to the specific bit extraction block 306 and the transmission block 305. In Step S114, the specific bit extraction block 306 extracts the data at the predetermined bit position of the scramble data in accordance with the rule, and supplies the same to the queue circuit 308_Q in the bit pattern accumulation buffer 308 to be accumulated, as described in FIG. 4. Further, the transmission block 305 transmits the scramble data through the transmission port 304 in Step S115, and the transmission of one scramble data is completed in Step S116.

Next, reception of the scramble data will be described. In FIG. 7B, reception of the scramble data is started in Step S210. In Step S211, the reception block 301 receives the scramble data through the reception port 300. The received scramble data is supplied to the reception buffer 303 and the specific bit extraction block 302.

Next, the bit pattern (scramble pattern) accumulated in the bit pattern accumulation buffer 308 is extracted in Step S212, and the scramble data is descrambled using the extracted scramble pattern in Step S213. Although not particularly limited, Step S212 and S213 are executed by the processor CPU in the embodiment as similar to Step S112 and S113 of FIG. 7A.

On the other hand, in Step S214, the specific bit extraction block 302 extracts the data at the predetermined bit position of the supplied scramble data in accordance with the rule, and supplies the same to the queue circuit 308_Q in the bit pattern accumulation buffer 308 to be accumulated, as described in FIG. 4. In Step S215, the reception of one scramble data is completed.

As similar to the case of the unscramble communication period Tns, the operations described in FIGS. 7A and 7B are alternately performed a plurality of times even in the scramble communication period Tss. Accordingly, the scramble pattern obtained by combining the pieces of data extracted from the pieces of scrambled transmission data with the pieces of data extracted from the pieces of scrambled reception data is accumulated in the bit pattern accumulation buffer 308.

In not only the unscramble communication period Tns, but also the scramble communication period Tss, the secrecy can be further enhanced because the scramble pattern is formed. Further, the scramble pattern is updated by the queue circuit 308_Q every time the communication data is transmitted and received, and thus the secrecy can be enhanced.

In the embodiment, even in the case where the unscramble data (normal data) irrelevant to the scramble data is transmitted in the data communications between the first semiconductor device 101_1 and the second semiconductor device 101_2, the normal data is always monitored by the first semiconductor device 101_1 and the second semiconductor device 101_2. Namely, even in the unscramble communication period Tns, the normal data to be transmitted and the received normal data are monitored by the specific bit extraction blocks 306 and 302, the data at the predetermined bit position in accordance with the rule is extracted every time the normal data is transmitted or received once, and the extracted data is continuously accumulated in the bit pattern accumulation buffer 308.

The bit pattern accumulated in the bit pattern accumulation buffer 308 is used as the scramble pattern. When the data requiring secrecy is communicated, the transmission data is scrambled and transmitted using the scramble pattern accumulated in the bit pattern accumulation buffer 308. Even in the semiconductor device receiving the scramble data, the normal data is monitored when the normal data is transmitted and received in the unscramble communication period Tns, and the same scramble pattern is accumulated in the bit pattern accumulation buffer 308. Thus, the received scramble data can be descrambled.

As described above, the scramble pattern is a combination of the data on the basis of the transmission data to be transmitted by itself (for example, the first semiconductor device 101_1) and the data on the basis of the transmission data transmitted by the semiconductor device (second semiconductor device 101_2) on the transmission side.

In the technique described in Japanese Unexamined Patent Application Publication No. Hei 9 (1997)-51312, the scramble data is unidirectionally transmitted from a broadcasting station to the reception side. Therefore, it is difficult to verify whether or not the received scramble data is correct on the reception side. On the contrary, the scramble pattern is based on the communication data transmitted from the semiconductor device on the transmission side and the communication data transmitted from the semiconductor device on the reception side in the embodiment. Thus, it is possible to verify whether or not the received scramble data is correct by descrambling the scramble data transmitted from the semiconductor device on the transmission side to determine whether or not the data is proper data.

In the case where the verification is conducted using, for example, "success OK" and "fail NG" indicating a result of a conditional determination, a binary bit string corresponding to a character string SUCCESS representing "success OK" and a binary bit string corresponding to a character string FAIL representing "fail "NG" are preliminarily set between the first semiconductor device 101_1 and the second semiconductor device 101_2.

For example, in the case where the second semiconductor device 101_2 transmits data representing the result of the conditional determination to the first semiconductor device 101_1 in the scramble communication period Tss, the second semiconductor device 101_2 scrambles the binary bit string corresponding to the character string SUCCESS and/or the binary bit string corresponding to the character string FAIL using the scramble pattern accumulated in the bit pattern accumulation buffer 308, and transmits the scramble data to the first semiconductor device 101_1.

In the first semiconductor device 101_1, the received scramble data is descrambled using the scramble pattern accumulated in the bit pattern accumulation buffer 308. If the binary bit string generated by descrambling is the character string SUCCESS or FAIL, it is possible to verify that the data is correct. On the other hand, if the generated binary bit string indicates other than the character string SUCCESS or FAIL, it is possible to confirm that the data is falsified.

Further, the scramble pattern is configured on the basis of the data transmitted and received while being temporally dispersed. Namely, the scramble pattern is configured using a plurality of bits (pieces of data) dispersed in the entire communications. Therefore, it is possible to reduce the possibility that the bits configuring the scramble pattern are specified by a third party.

Furthermore, since the scramble pattern is updated even in the scramble communication period Tss, the secrecy can be further enhanced.

Second Embodiment

In the first embodiment, the scramble pattern is generated on the basis of the pieces of communication data in the unscramble communication period Tns. In the case where the pieces of communication data transmitted and received in the unscramble communication period Tns are not random but similar to each other, there is a concern that the scramble pattern to be generated is not random but, for example, a fixed bit pattern.

In the embodiment, a sequence number is added to the communication data transmitted in the unscramble communication period Tns. Further, the communication data is scrambled by a hash function, and the specific bit extraction block 306 extracts data at a predetermined bit position from the scrambled communication data. Likewise, the received communication data is also scrambled by the hash function, and the specific bit extraction block 302 extracts data at a predetermined bit position from the scrambled communication data. The extracted data is accumulated in the bit pattern accumulation buffer 308 to be used as a scramble pattern.

Figure 8:
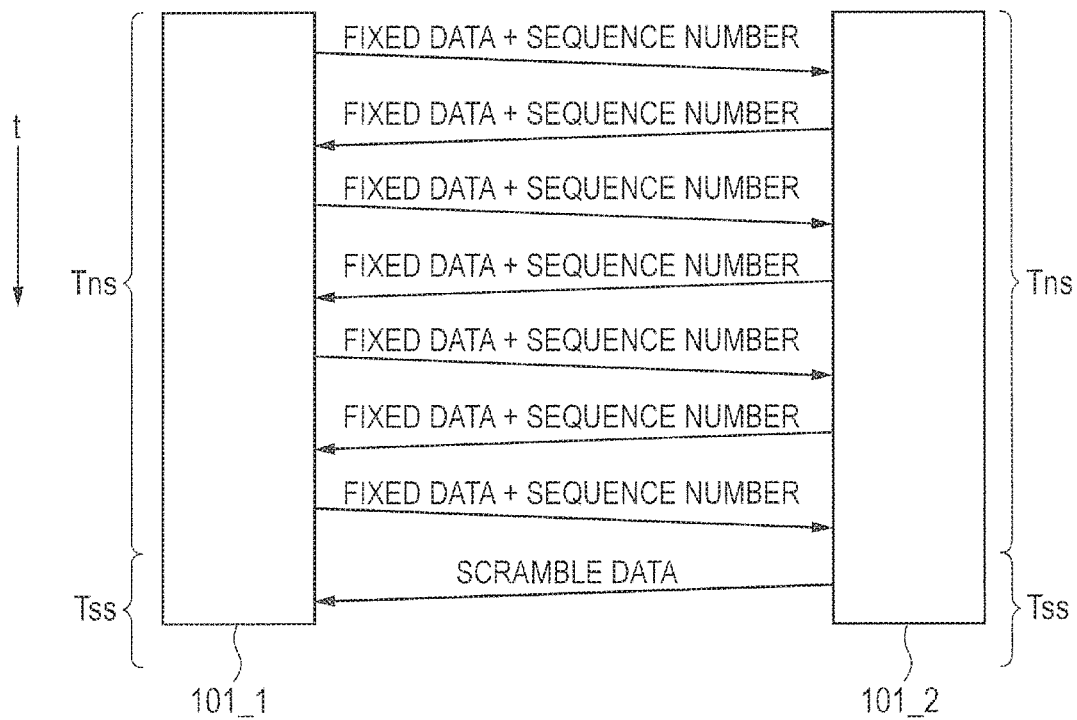
FIG. 8 is an explanation diagram for explaining data communications in a system according to a second embodiment.

FIG. 8 is an explanation diagram for explaining data communications in a system according to a second embodiment. Since FIG. 8 is similar to FIG. 2B, different points will be mainly described. In the embodiment, the first semiconductor device 101_1 adds a sequence number to fixed communication data (fixed data) to be transmitted as communication data in the unscramble communication period Tns. Likewise, the second semiconductor device 101_2 also adds a sequence number to fixed communication data (fixed data) to be transmitted as communication data. Here, although not particularly limited, the fixed data has the same value. Further, the sequence number indicates a serial number of the communication data to be transmitted in the unscramble communication period Tns. For example, in the first transmission by the first semiconductor device 101_1 in the unscramble communication period Tns, the sequence number is 1, and the sequence number is incremented every time the data is transmitted. Accordingly, at least the sequence numbers differ among the pieces of transmitted communication data, and thus each communication data has a different value.

Figure 9:
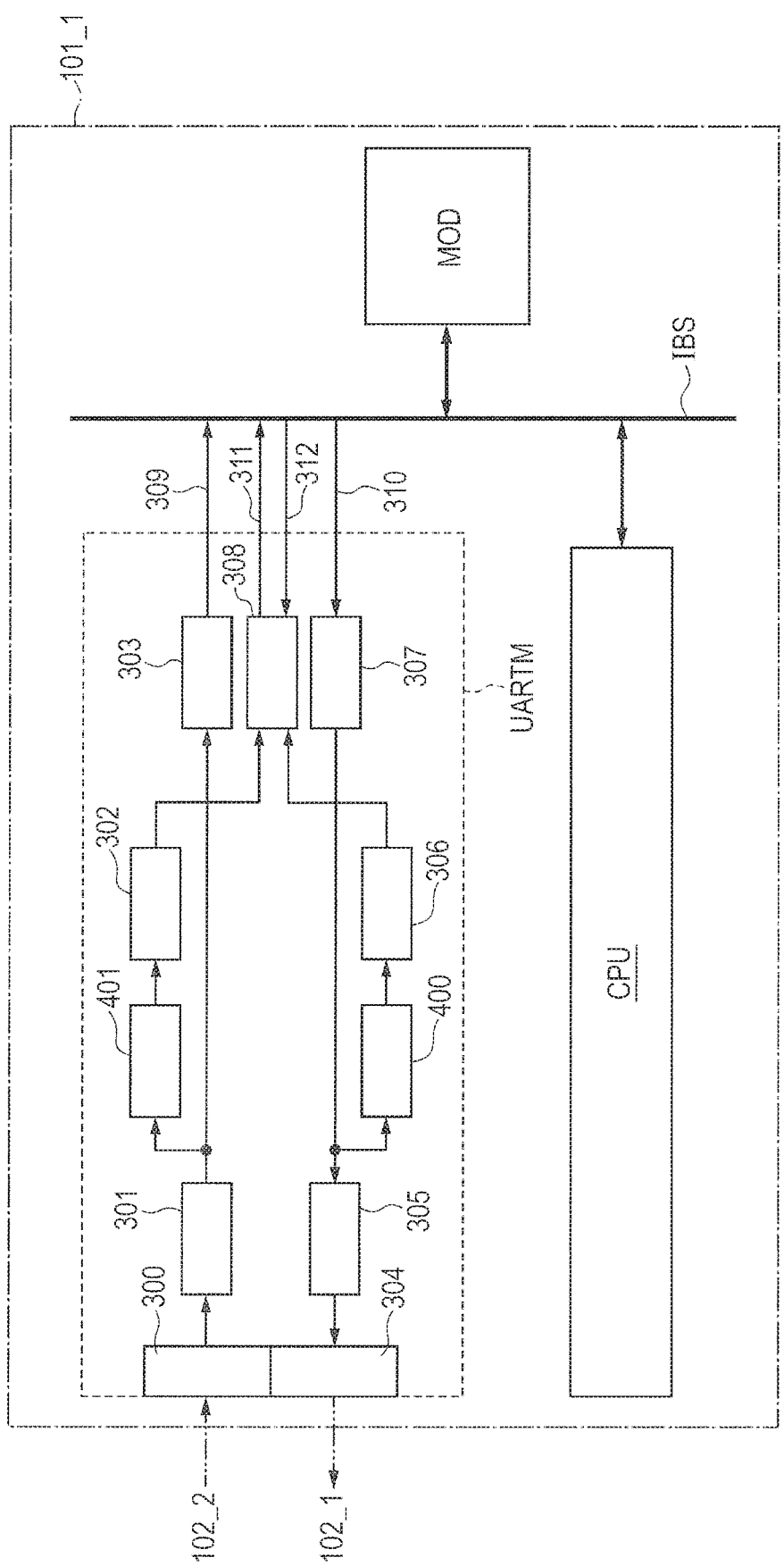
FIG. 9 is a block diagram for showing a configuration of a semiconductor device according to the second embodiment.

FIG. 9 is a block diagram for showing a configuration of the first semiconductor device 101_1 according to the second embodiment. Further, the configuration of the data communication functional module UARTM: of the second semiconductor device 101_2 is the same as that of the first semiconductor device 101_1 even in the embodiment. Since FIG. 9 is similar to FIG. 3, different points will be mainly described. As the different points, hash function blocks 400 and 401 are added, and the processor CPU adds the sequence number to the fixed data to generate the communication data for transmission in the unscramble communication period Tns.

When receiving the transmission data output from the transmission buffer 307, the hash function block 400 scrambles the transmission data using a hash function. The scrambled transmission data is supplied to the specific bit extraction block 306. Further, reception data output from the reception block 301 is input to the hash function block 401. The hash function block 401 also scrambles the reception data using the hash function. The scrambled reception data is supplied to the specific bit extraction block 302. Since the operations of the specific bit extraction blocks 302 and 306 are the same as those in the first embodiment, the explanation thereof will be omitted.

The hash function block 400 of the first semiconductor device 101_1 and the hash function block 401 of the second semiconductor device 101_2 scramble the data in the same manner. Further, the hash function block 400 of the second semiconductor device 101_2 and the hash function block 401 of the first semiconductor device 101_1 scramble the data in the same manner. Accordingly, the bit pattern accumulation buffer 308 in the first semiconductor device 101_1 and the bit pattern accumulation buffer 308 in the second semiconductor device 101_2 can accumulate the same scramble pattern.

Figure 11A:
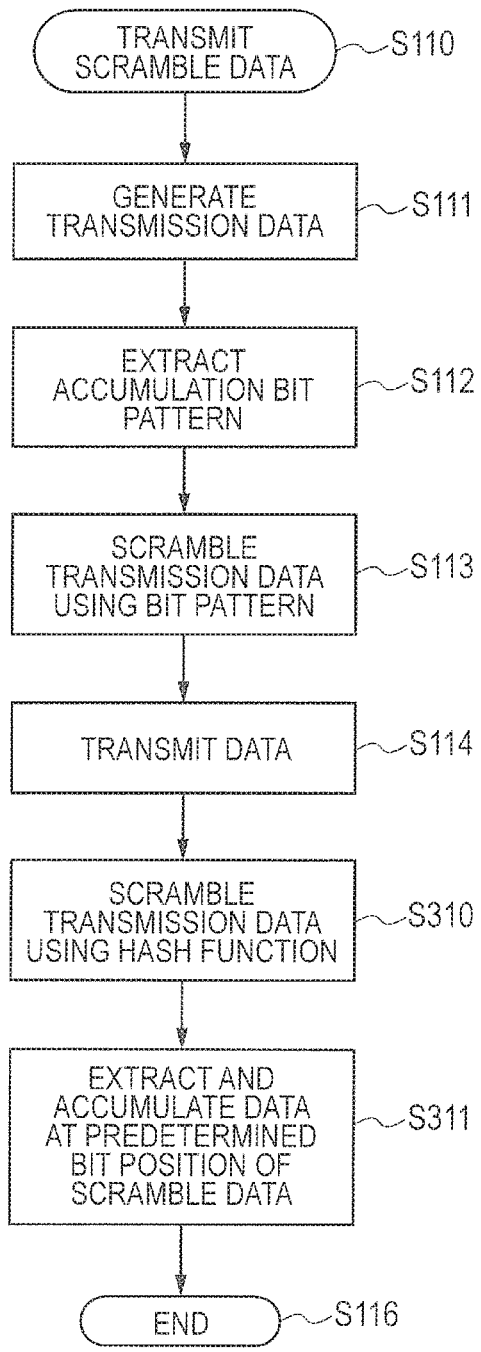
FIGS. 11A and 11B are flowcharts each showing an operation of the semiconductor device according to the second embodiment.
Figure 11B:
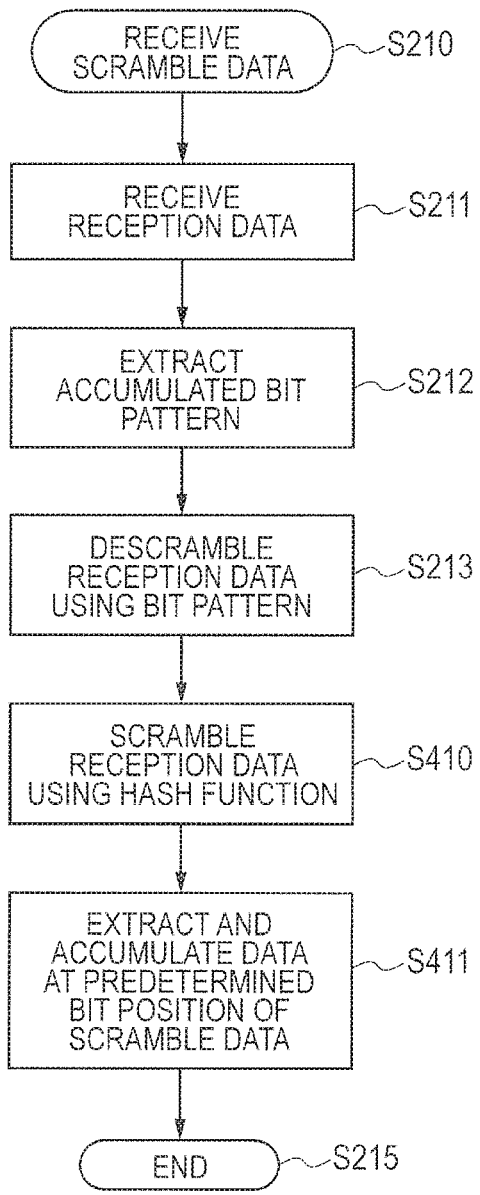

FIGS. 10A-10B and FIGS. 11A-11B are flowcharts each showing an operation of the first semiconductor device 101_1 according to the second embodiment. Further, an operation of the second semiconductor device 101_2 is the same as that of the first semiconductor device 101_1. FIGS. 10A and 10B show an operation related to transmission and reception of the normal data in the unscramble communication period Tns, and FIGS. 11A and 11B show an operation related to transmission and reception of the scramble data in the scramble communication period Tss. Here, FIGS. 10A and 10B are similar to FIGS. 6A and 6B, respectively, and FIGS. 11A and 11B are similar to FIGS. 7A and 7B, respectively. Thus, different points will be mainly described.

In Step S101 of FIG. 6A, the processor CPU generates the transmission data. On the contrary, in FIG. 10A, Step S101 shown in FIG. 6 is changed to Steps S101_0 to S101_2. In Step S101_0, the processor CPU generates the fixed data as the transmission data. Next, the processor CPU adds 1 to the sequence number in Step S101_1. Further, in Step S101_2, the processor CPU adds the sequence number calculated in Step S101_1 to the fixed transmission data generated in Step S101_0 to be set as the transmission data to be transmitted, and supplies the same to the transmission buffer 307. The sequence number is 0 when the unscramble communication period Tns is started. Step S101_1 is repeatedly executed by repeating the flowchart shown in FIG. 10A, and the sequence number is incremented.

The transmission data input to the transmission buffer 307 is transmitted in Step S103. Further, the transmission data is also supplied from the transmission buffer 307 to the hash function block 400, and thus the hash function block 400 scrambles the supplied transmission data using the hash function in Step S300. The scrambled transmission data (scrambled data) is supplied to the specific bit extraction block 306. The specific bit extraction block 306 extracts the data at the predetermined bit position from the scrambled data to be accumulated in the bit pattern accumulation buffer 308 in Step S301, as described in FIG. 4.

Accordingly, the transmission data including the sequence number is transmitted, the transmission data is scrambled using the hash function, and the data at the predetermined bit position in the scrambled data is accumulated in the bit pattern accumulation buffer 308.

FIG. 10B is different from FIG. 6B in that Step S202 is changed to Steps S400 and S401. Further, in Step S201, the fixed data with the sequence number added is received as the reception data. In Step S400, the reception data supplied from the reception block 301, namely, the fixed data with the sequence number added is scrambled by the hash function block 401. The scrambled data is supplied to the specific bit extraction block 302. The specific bit extraction block 302 extracts the data at the predetermined bit position from the scrambled data to be accumulated in the bit pattern accumulation buffer 308 in Step S401, as described in FIG. 4.

In the unscramble communication period Tns, the operation shown in FIG. 10A and the operation shown in FIG. 10B are alternately and repeatedly executed. Accordingly, in the unscramble communication period Tns, the sequence number is incremented every time the communication data is transmitted, and the pieces of communication data having values that are different from each other are supplied to the hash function blocks 400 and 401. As a result, the scrambled data becomes different, and the random bit pattern is accumulated in the bit pattern accumulation buffer 308.

Next, an operation in the scramble communication period Tss will be described. FIG. 11A is different from FIG. 7A in that Step S115 of FIG. 7A is changed to Step S114 in FIG. 11A, and Steps S310 and S311 instead of Step S114 of FIG. 7A are added after Step S114. Steps S310 and S311 added are the same as Steps S300 and S301 of FIG. 10A.

Next, an operation of reception in the scramble communication period Tss will be described using FIG. 11B. FIG. 11B is different from FIG. 7B in that Step S214 is changed to Steps S410 and S411. Steps S410 and S441 are the same as Steps S400 and S401 shown in FIG. 10B.

Even in the scramble communication period Tss, the operation shown in FIG. 11A and the operation shown in FIG. 11B are alternately executed. Therefore, even in the scramble communication period Tss, the communication data is scrambled using the hash function in Steps S310 and S410, and the data at the predetermined bit position is extracted and accumulated in Steps S311 and S411. As a result, the scramble pattern is generated and updated in the scramble communication period Tss even in the embodiment.

In the second embodiment, the transmission data includes the sequence number that is incremented every time the transmission operation is performed in the unscramble communication period Tns, and thus the value of the transmission data can be made different even using the fixed data. Further, the scramble pattern is generated on the basis of the scrambled data scrambled using the hash function, and thus the scramble pattern can be more randomly formed even though only the sequence number is different.

Further, since the scramble pattern is formed on the basis of the scrambled data scrambled using the hash function even in the scramble communication period Tss, the scramble pattern can be more randomly formed, and the safety of the secret data communications can be improved.

Third Embodiment

In the first and second embodiments, the data at the predetermined bit position is extracted from each of the transmission data to be transmitted and the received reception data in accordance with the rule set between the first semiconductor device 101_1 and the second semiconductor device 101_2, and the scramble pattern is generated. On the contrary, in the embodiment, a parameter configuring the scramble pattern is transmitted and received using voltage amplitude in a communication line coupling between the first semiconductor device 101_1 and the second semiconductor device 101_2. Namely, the voltage amplitude of communication data in the communication line is configured to vary by a few percent as compared to normal voltage amplitude in accordance with the parameter configuring the scramble pattern.

Figure 12:
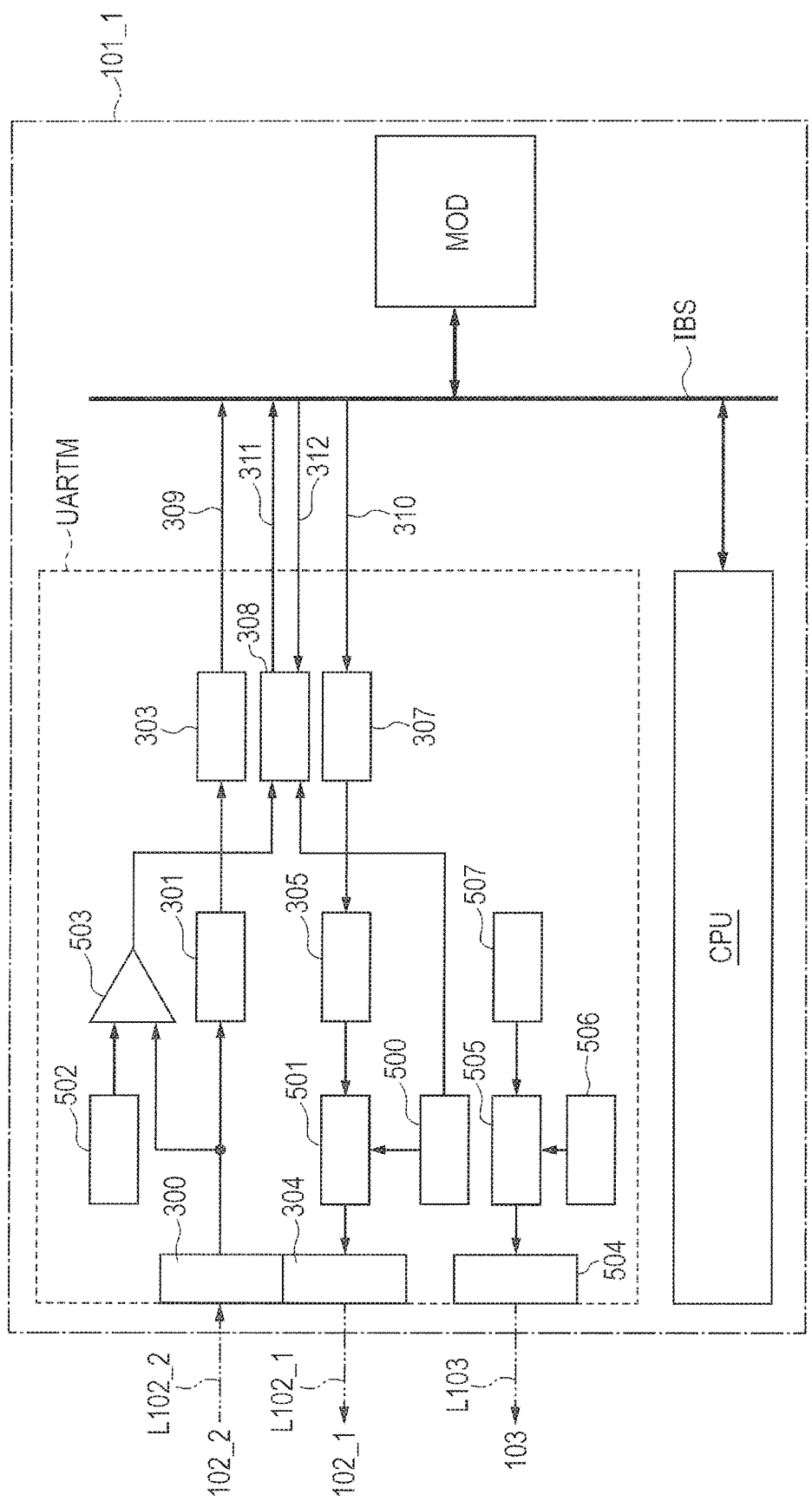
FIG. 12 is a block diagram for showing a configuration of a semiconductor device according to a third embodiment.

Next, a configuration of a semiconductor device according to a third embodiment will be described using the drawings. FIG. 12 is a block diagram for showing a configuration of the first semiconductor device 101_1 according to the third embodiment. Although the first semiconductor device 101_1 will be described as an example in the embodiment, the configuration of the data communication functional module UARTM is the same as that of the second semiconductor device 101_2. Since FIG. 12 is similar to FIG. 3, different points will be mainly described in the embodiment. In the first semiconductor device 101_1 according to the embodiment, a scramble parameter generation block 500, a transmission data amplitude control block 501, a reference voltage generation block 502, and a voltage comparison block 503 are added to the first semiconductor device shown in FIG. 3.

Further, although not illustrated in FIG. 3 and FIG. 9, a part that generates the synchronization clock signal 103 is illustrated in FIG. 12. In the drawing, the reference numeral 504 denotes a clock signal port 504 that outputs the synchronization clock signal 103, 505 denotes a clock signal amplitude control block, 506 denotes a random signal generation block, and 507 denotes a synchronization clock signal generation block.

Further, in FIG. 12, a first communication line that couples between the first semiconductor device 101_1 and the second semiconductor device 101_2 and transmits the communication data from the first semiconductor device 101_1 to the second semiconductor device 101_2 is represented by a two-dot chain line L102_1. Likewise, a second communication line that couples between the first semiconductor device 101_1 and the second semiconductor device 101_2 and transmits the communication data from the second semiconductor device 101_2 to the first semiconductor device 101_1 is represented by a two-dot chain line L102_2. Further, a clock signal line that couples between the first semiconductor device 101_1 and the second semiconductor device 101_2 and transmits the synchronization clock signal 103 between the first semiconductor device 101_1 and the second semiconductor device 101_2 is represented by a two-dot chain line L103.

The scramble parameter generation block 500 generates a random bit pattern. The generated bit pattern is supplied to the transmission data amplitude control block 501 and the bit pattern accumulation buffer 308. The transmission data amplitude control block 501 causes the voltage amplitude of the communication data output from the transmission block 305 to vary in accordance with the supplied bit pattern. The communication data whose voltage amplitude varied is transmitted to the first communication line L102_1 through the transmission port 304.

The reference voltage generation block 502 generates a reference voltage. The generated reference voltage is supplied to the voltage comparison block 503. The voltage comparison block 503 compares the supplied reference voltage with a voltage in the second communication line L102_2 transmitted through the reception port 300, and supplies the comparison result to the bit pattern accumulation buffer 308 as a bit pattern. Namely, the voltage comparison block 503 compares the reference voltage with the voltage amplitude of the received communication data to generate the bit pattern indicating whether or not the voltage amplitude of the reception data is larger than the reference voltage, and supplies the same to the bit pattern accumulation buffer 308.

The bit pattern accumulation buffer 308 accumulates the bit pattern from the scramble parameter generation block 500 and the bit pattern from the voltage comparison block 503. The two bit patterns are combined with each other by the accumulation, and the combined bit pattern is output from the bit pattern accumulation buffer 308 as the scramble pattern 311. Namely, the parameter that causes the voltage amplitude of the communication data to be transmitted to vary and the parameter that appears as the variation of the voltage amplitude in the received communication data are combined with each other by the bit pattern accumulation buffer 308, and the scramble pattern is generated.

Although not particularly limited in the embodiment, the voltage amplitude of the synchronization clock signal 103 is also configured to vary. The clock signal generation block 507 generates a clock signal having a predetermined cycle suitable for synchronization. The random signal generation block 506 generates a random signal. The clock signal amplitude control block 505 causes the voltage amplitude of the clock signal generated by the clock signal generation block 506 to vary in accordance with the signal generated by the random signal generation block 506. The clock signal that varied is transmitted to a clock signal line L103 through the clock signal port 504. Accordingly, the synchronization clock signal 103 transmitted in the clock signal line L103 is changed at cycles suitable for synchronization, and the voltage amplitude that is further changed randomly varies.

<Voltage Variation of Communication Line>

Next, an example of causing the communication line to vary in accordance with the bit pattern generated by the scramble parameter generation block 500 will be described using FIGS. 13A-13D. FIGS. 13A-13D are waveform diagrams each showing the voltage variation of the communication line according to the third embodiment. Here, FIG. 13A shows the logical values of the bit pattern generated by the scramble parameter generation block 500, FIG. 13B shows voltage changes in a first communication line L102_1, and FIG. 13C shows the logical values of the communication data to be transmitted. Further, FIG. 13D shows voltage changes in the clock signal line L103. In FIGS. 13A-13D, the horizontal axis t represents time common in FIGS. 13A to 13D.

In FIG. 13B, each broken line represents the voltage waveform of the communication data output from the transmission block 305, and each solid line represents the voltage waveform in the first communication line L102_1. In the embodiment, in the case where the logical value "1" is supplied from the scramble parameter generation block 500, the transmission data amplitude control block 501 controls to raise the voltage of the communication data supplied from the transmission block 305. In the case where the logical value "0" is supplied, the transmission data amplitude control block 501 controls to drop the voltage of the communication data.

As shown by the broken line of FIG. 13B and in FIG. 13C, in the case where the logical value of the communication data is "0", the voltage of the communication data from the transmission block 305 is V2. In the case where the logical value of the communication data is "1", the voltage is V5. Namely, the voltage of the communication data from the transmission block 305 changes between the voltage V2 and the voltage V5 in accordance with the logical value of the communication data.

In the case where the voltage of the communication data is V2, the transmission data amplitude control block 501 controls the voltage of the communication data to be output to be V1 or V3 in accordance with the logical value "1" or "0" from the scramble parameter generation block 500. Further, in the case where the voltage of the communication data is V5, the transmission data amplitude control block 501 controls the voltage of the communication data to be output to be V4 or V6 in accordance with the logical value "1" or "0" from the scramble parameter generation block 500. Accordingly, the voltage of the communication data in the first communication line L102_1 is any one of V1, V3, V4, and V6 in accordance with the logical value of the communication data (the output of the transmission block 305) to be transmitted and the logical value of the bit generated by the scramble parameter generation block 500. Namely, the voltage of the communication data to be transmitted varies in accordance with the logical value of the bit (data) in the bit pattern generated by the scramble parameter generation block 500.

Likewise, the voltage of the synchronization clock signal 103 in the clock signal line L103 also varies so as to be V3, V4, or V6 in accordance with the logical value of the bit generated by the random signal generation block 506 as shown in FIG. 13D.

The scramble parameter generation block 500 in the embodiment outputs the bit string as shown in FIG. 13A to the bit pattern accumulation buffer 308 as the bit pattern.

The data communication functional module UARTM in the second semiconductor device 101_2 includes the same configuration as the data communication functional module UARTM shown in FIG. 12. Therefore, the communication data with the voltage amplitude modulated in accordance with the bit pattern generated by the scramble parameter generation block 500 in the second semiconductor device 101_2 is transmitted and supplied from the second semiconductor device 101_2 to the voltage comparison block 503 of the first semiconductor device 101_1 through the second communication line L102_2.

The voltage comparison block 503 determines whether the bit in the received communication data is any one of the above-described voltages V1, V3, V4, and V5 on the basis of the reference voltage generated by the reference voltage generation block 502, and specifies the bit pattern generated by the scramble parameter generation block 500 of the second semiconductor device 101_2. For example, if the voltage of the bit in the received communication data is V3 or V6, the voltage comparison block 503 specifies the logical value of the bit in the bit pattern transmitted by the bits in the received communication data as "1". On the contrary, if the voltage of the bit in the received communication data is V1 or V4, the voltage comparison block 503 specifies the logical value of the bit in the bit pattern transmitted by the bits in the received communication data as "0".

The voltage comparison block 503 outputs the bit pattern thus specified and generated to the bit pattern accumulation buffer 308. Namely, the bit pattern serving as a parameter is extracted from the communication data. Further, for example, when the voltage of the bit in the received communication data is V1, V2, or V3, the reception block 301 specifies the original logical value of the bit in the communication data as "0". When the voltage is V4, V5, or V6, the reception block 301 specifies the original logical value of the bit in the communication data as "1". Accordingly, the original bit value transmitted is extracted, and is output to the reception buffer 303.

The processor CPU reads the scramble pattern 311 accumulated in the bit pattern accumulation buffer 308 to descramble the received communication data and to scramble the communication data to be transmitted.

<Operation of Data Communications>

Figure 14A:
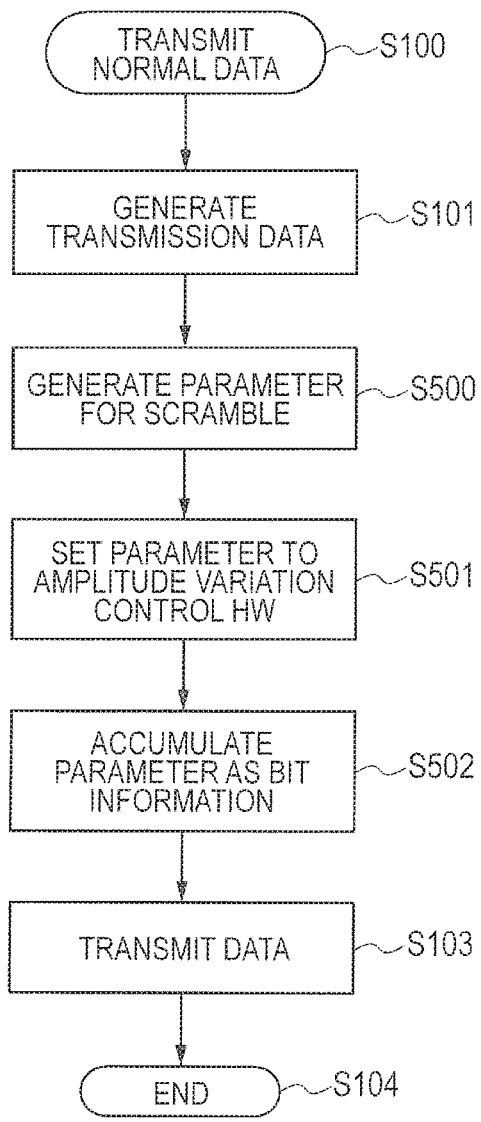
FIGS. 14A and 14B are flowcharts each showing an operation of the semiconductor device according to the third embodiment.
Figure 14B:
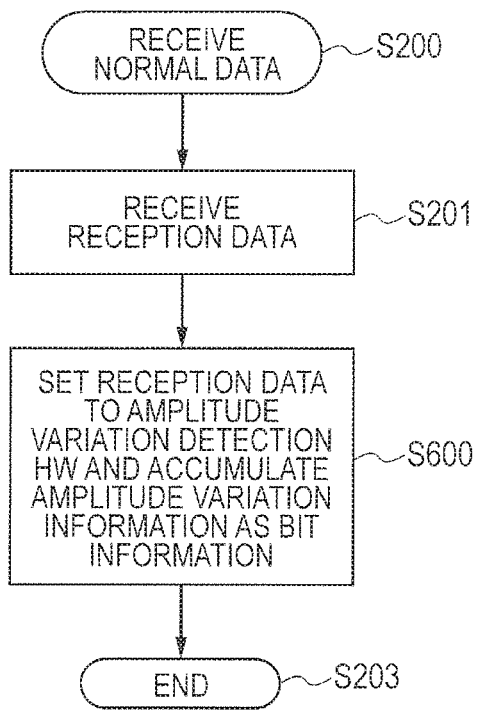

FIGS. 14A-14B and FIGS. 15A-15B are flowcharts each showing an operation of the first semiconductor device 101_1 according to the third embodiment. An operation of the second semiconductor device 101_2 is the same as that of the first semiconductor device 101_1. FIGS. 14A and 14B show an operation related to transmission and reception of the normal data in the unscramble communication period Tns, and FIGS. 15A and 15B show an operation related to transmission and reception of the scramble data in the scramble communication period Tss. Here, FIGS. 14A and 14B are similar to FIGS. 6A and 6B, respectively, and FIGS. 15A and 15B are similar to FIGS. 7A and 7B, respectively. Thus, different points will be mainly described.

FIG. 14A is different from FIG. 6A in that Step S102 is changed to Steps S500 to S502. In Step S500, the scramble parameter generation block 500 generates a bit pattern serving as a parameter. The parameter is set to amplitude variation control hardware (hereinafter, the hardware is referred to as HW) in Step S501, and further is supplied to the bit pattern accumulation buffer 308 as bit information to be accumulated in the bit pattern accumulation buffer 308 in Step S502. Accordingly, in Step S101, the voltage amplitude of the transmission data generated by the processor CPU is caused to vary as described in FIGS. 13A-13D, and the transmission data is transmitted in Step S103. Here, the amplitude variation control HW (control block) includes the transmission data amplitude control block 501 shown in FIG. 12.

FIG. 14B is different from FIG. 6B in that Step S202 is changed to Step S600. In Step S600, the reception data is set to amplitude variation detection HW, and the amplitude variation detection HW accumulates amplitude variation (amplitude variation information) in the reception data into the bit pattern accumulation buffer 308 as bit information. Further, although not shown in the drawing, the original bit transmitted is extracted from the reception data, and is output to the reception buffer. Here, the amplitude variation detection HW (detection block) includes the reference voltage generation block 502 and the voltage comparison block 503 shown in FIG. 12.

Next, an operation of the data communications in the scramble communication period Tss will be described. Even in the embodiment, the scramble pattern is updated even in the scramble communication period Tss as similar to the first embodiment. Therefore, in FIG. 15A, Step S114 shown in FIG. 7A is changed to Steps S510 to S512. Further, in FIG. 15B, Step S214 shown in FIG. 7B is changed to Step S610.

Steps S510 to S512 shown in FIG. 15A are the same as Steps S500 to S502 shown in FIG. 14A, and Step S610 shown in FIG. 15B is the same as Step S600 shown in FIG. 14B. The parameter is generated by executing Steps S510 to S512 for the communication data to be transmitted even in the scramble communication period Tss, and the voltage amplitude of the transmission data can be caused to vary in accordance with the generated parameter. Further, the parameter can be extracted from the reception data by executing Step S610 for the reception data whose voltage amplitude varied.

The safety of the secret data can be further improved by generating the parameter to update the scramble pattern accumulated in the bit pattern accumulation buffer 308 even in the scramble communication period Tss.

In the embodiment, the logical value of the bit configuring the scramble pattern does not directly appear as the logical value of the bit in the communication data transmitted and received between the semiconductor devices. Therefore, it is possible to reduce the possibility that the scramble pattern is specified by a third party.

Further, in the embodiment, the voltage amplitude of the synchronization clock signal 103 is also modulated as similar to the voltage amplitude of the transmission data. Therefore, it is possible to make it difficult to determine whether or not the bit of the scramble pattern is represented by the voltage amplitude. It is obvious that the voltage amplitude of the synchronization clock signal 103 need not be modulated. Alternatively, the bit of the scramble pattern may be represented by the voltage amplitude of the synchronization clock signal 103.

Fourth Embodiment

A fourth embodiment is different from the first and second embodiments, and is similar to the third embodiment. In the third embodiment, the parameter generated by the semiconductor device of the communication partner among those configuring the scramble pattern is provided as the voltage amplitude of the communication data in the communication line. On the contrary, in the embodiment, the parameter generated by the semiconductor device of the communication partner is provided as the cycle of the communication data transmitted in the communication line. Namely, the semiconductor device that transmits the communication data causes the cycle of the communication data to vary by a few percent with respect to the normal cycle in accordance with the parameter. In the semiconductor device that receives the communication data, the parameter is extracted on the basis of the variation of the cycle, and the scramble pattern is generated by combining the extracted parameter with the generated parameter.

Figure 16:
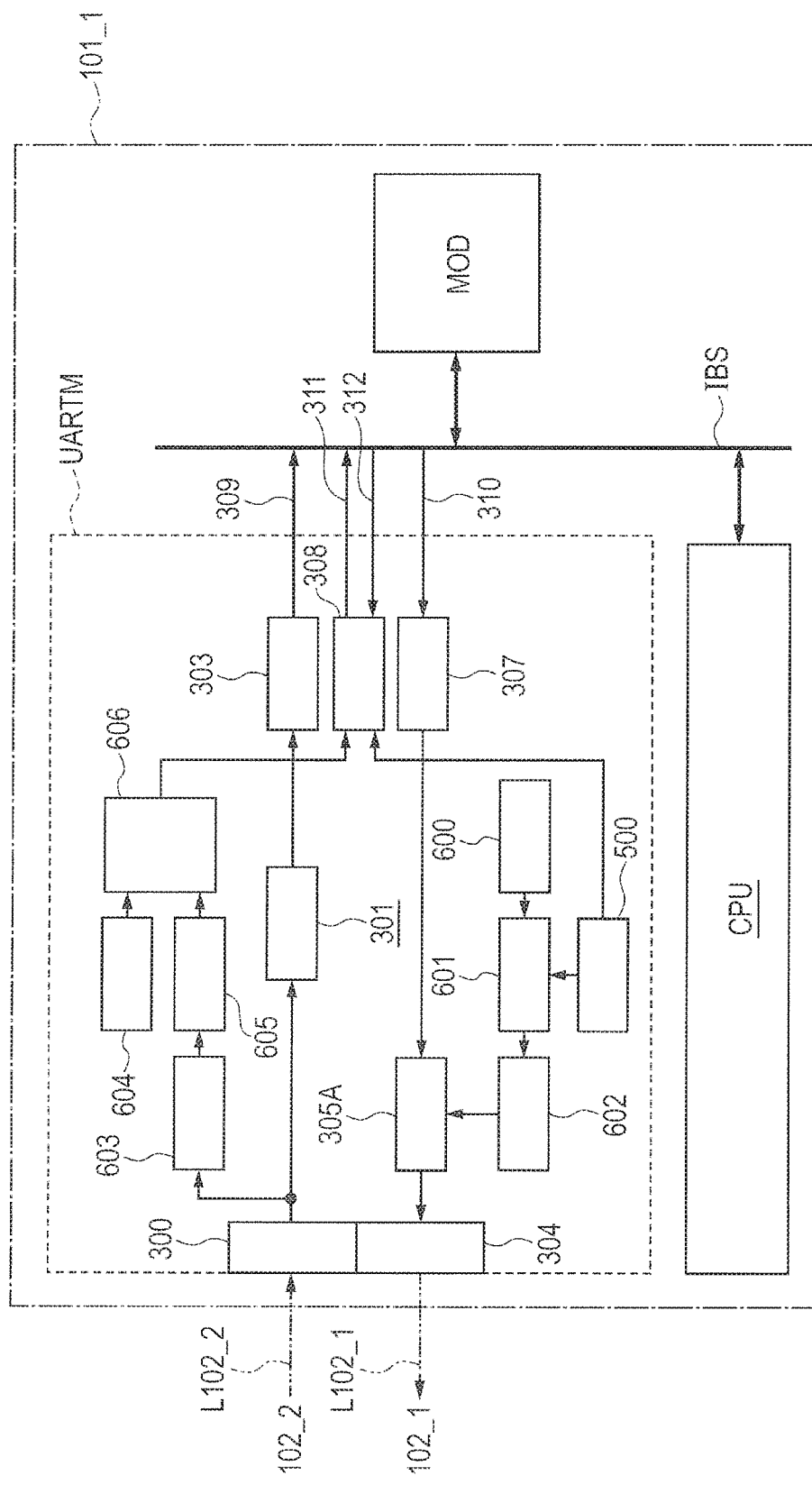
FIG. 16 is a block diagram for showing a configuration of a semiconductor device according to a fourth embodiment.

FIG. 16 is a block diagram for showing a configuration of the first semiconductor device 101_1 according to the fourth embodiment. Here, points different from FIG. 3 will be mainly described. In FIG. 3, the data communication functional module UARTM is provided with the specific bit extraction blocks 302 and 306. However, in FIG. 16, the following circuit blocks are provided instead of these blocks. Namely, as transmission blocks, the data communication functional module UARTM includes a scramble parameter generation block 500, a system clock generation block 600, a frequency-division-ratio-variable variable frequency divider 601, and a transmission cycle generation block 602 instead of the specific bit extraction block 306. Further, as reception blocks, the data communication functional module UARTM includes a reception data cycle detection block 603, a reference cycle generation block 604, a reception data cycle measurement block 605, and a comparison block 606 instead of the specific bit extraction block 302.

Further, the transmission block 305 shown in FIG. 3 is changed so that the cycle of the communication data to be transmitted can be changed in accordance with an output from the transmission cycle generation block 602, and the reference numeral is changed to 305A. Further, the first semiconductor device 101_1 and the second semiconductor device 101_2 according to the embodiment perform data communications in accordance with the Manchester encoding system. Here, although not particularly limited, it is assumed that the rising of the voltage represents the logical value "0" and the dropping of the voltage represents the logical value "1" in the first communication line L102_1 and the second communication line L102_2.

The scramble parameter generation block 500 is the same as the scramble parameter generation block shown in FIG. 12, and generates a random bit pattern. The generated random bit pattern is supplied to not only the bit pattern accumulation buffer 308, but also the variable frequency divider 601.

The system clock generation block 600 generates a system clock having a predetermined fixed frequency. The frequency division ratio of the variable frequency divider 601 is changed in accordance with the supplied random bit pattern. Namely, the frequency division ratio differs depending on whether the bit (data) in the bit pattern is the logical value "1" or the logical value "0". The system clock is divided by the variable frequency divider 601, and the divided system clock is supplied to the transmission cycle generation block 602. The transmission cycle generation block 602 sets the cycle of the transmission data on the basis of the supplied system clock. The transmission block 305A transmits the communication data from the transmission buffer 307 at the cycle set by the transmission cycle generation block 602.

Since the frequency division ratio of the variable frequency divider 601 is changed in accordance with the logical value of the scramble parameter generated by the scramble parameter generation block 500, the frequency (cycle) of the system clock supplied to the transmission cycle generation block 602 is also changed in accordance with the logical value of the scramble parameter. As a result, the cycle of the transmission data set by the transmission cycle generation block 602 is also changed in accordance with the logical value of the scramble parameter. Accordingly, the cycle of the communication data transmitted to the first communication line L102_1 through the transmission block 305A or the transmission port 304 is also changed (vary) in accordance with the logical value of the scramble parameter.

The second semiconductor device 101_2 also includes a data communication functional module whose configuration is the same as that of the data communication functional module UARTM shown in FIG. 16, and the communication data is transmitted from the second semiconductor device 101_2 to the second communication line L102_2. It is obvious that the communication data from the first semiconductor device 101_1 is transmitted to the reception port of the second semiconductor device 101_2 through the first communication line L102_1.

The cycle of the communication data transmitted from the second semiconductor device 101_2 also varies in accordance with the scramble parameter generated by the scramble parameter generation block 500 in the second semiconductor device 101_2. The communication data is supplied to the reception block 301 and the reception data cycle detection block 603 through the reception port 300 shown in FIG. 16. The reception block 301 supplies the supplied reception data to a reception data buffer 303.

The reception data cycle detection block 603 detects the cycle of the communication data. The reception data cycle measurement block 605 measures the length (interval) of the cycle detected by the reception data cycle detection block 603. The reference cycle generation block 604 generates a cycle serving as a reference value. The comparison block 606 compares the reference cycle generated by the reference cycle generation block 604 with the length of the cycle measured by the reception data cycle measurement block 605, and expresses whether or not the measured length is longer than the reference cycle by using the logical value "1" or "0". Then, the logical value is sequentially supplied to the bit pattern accumulation buffer 308. Accordingly, the variation of the cycle of the communication data supplied to the reception port 301 is sequentially converted into the logical value to be accumulated into the bit pattern accumulation buffer 308 as the bit pattern.

<Cycle Variation of Communication Data>

FIGS. 17A-17D are waveform diagrams each explaining the cycle variation of the communication data according to the fourth embodiment. Here, FIG. 17A shows the waveform of the reference clock signal, FIG. 17B shows the logical values of the bit pattern generated by the scramble parameter generation block 500, FIG. 17C shows the voltage waveform of the communication data, and FIG. 17D shows the logical values of the communication data. In FIGS. 17A-17D, the horizontal axis t represents time common in FIGS. 17A to 17D.

In the embodiment, the communication data is Manchester-encoded as described above. Therefore, the reference clock signal shown in FIG. 17A need not be supplied to the first semiconductor device 101_1 and the second semiconductor device 101_2 as a synchronization clock signal, but is illustrated to easily understand the explanation.

In FIG. 17C, each broken line represents the voltage waveform of the communication data in the case where the cycle variation is not conducted. In the case where the cycle variation is not conducted, the communication data rises or falls in accordance with the logical value of the communication data to be transmitted in the middle of the cycle Tc of the reference clock signal because the Manchester encoding is performed.

In the embodiment, the frequency division ratio by which the system clock is divided is changed in accordance with the logical value of the bit pattern generated by the scramble parameter generation block 500, and the cycle of the communication data varies as shown by, for example, the solid line in the FIG. 17C. As shown in FIGS. 17B and 17C, in the case where the logical value of the bit pattern is "0", the voltage change becomes faster as compared to a case in which the cycle variation represented by the broken line is not conducted. In the case where the logical value of the bit pattern is "1", the voltage change becomes slower. For example, in the case where the logical value of the bit pattern is "1", a period of time from the rising in the cycle of the reference clock signal corresponding to the previous communication data to the time the voltage of the communication data is changed in accordance with the logical value of the communication data to be transmitted corresponds to a period of time Tr (=Tc) in the case where the cycle variation is not conducted. On the contrary, in the case where the cycle variation is conducted in accordance with the embodiment, the period of time corresponds to a period of time Td.

The reception data cycle detection block 603 shown in FIG. 16 detects a period of time from the rising of the reference clock signal corresponding to the previous communication data to the time the voltage change by the Manchester encoding occurs as a cycle. The reception data cycle measurement block 605 measures the length of the detected cycle. Namely, the period of time Td is measured.

The reference cycle generation block 604 generates a cycle of a reference value in which a period of time from the rising of the reference clock signal to the next rising is assumed as one cycle (Tc=Tr). The comparison block 606 compares the period of time of the cycle of the reference value with the period of time Td of the detected cycle, and the logical value of the bit pattern can be obtained on the basis of the cycle variation by expressing the comparison result as the logical value.

<Operation of Data Communications>

Figure 18A:
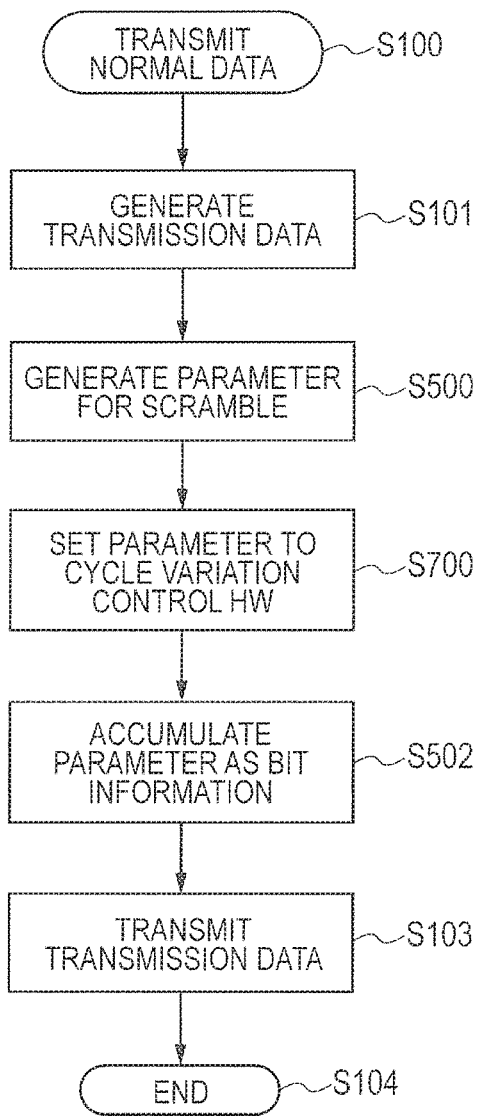
FIGS. 18A and 18B are flowcharts each showing an operation of the semiconductor device according to the fourth embodiment.
Figure 18B:
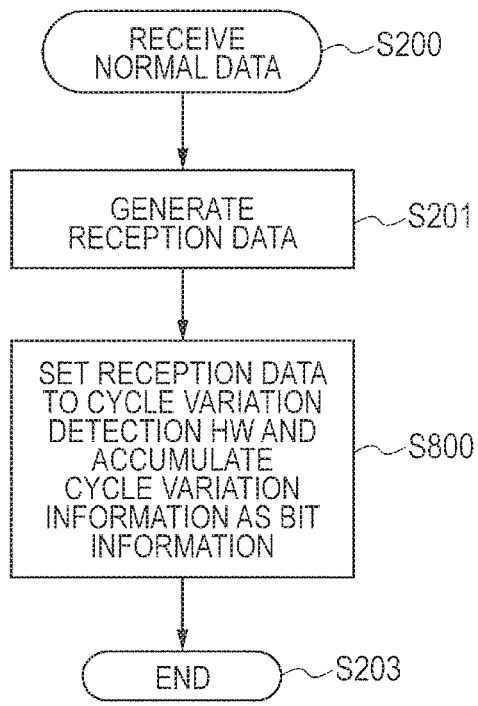

Next, an operation of the first semiconductor device 101_1 in the data communications will be described. Here, although an operation of the first semiconductor device 101_1 will be described, an operation of the second semiconductor device 101_2 is also the same. FIGS. 18A-18B and FIGS. 19A-19B are flowcharts each showing an operation of the first semiconductor device 101_1 according to the fourth embodiment. Here, FIGS. 18A-18B show an operation in the unscramble communication period Tns, and FIGS. 19A-19B shown an operation in the scramble communication period Tss. FIGS. 18A and 18B are similar to FIGS. 14A and 14B, respectively, and FIGS. 19A and 19B are similar to FIGS. 15A and 15B, respectively. Thus, different points will be mainly described.

FIG. 18A is different from FIG. 14A in that Step S501 is changed to Step S700. In Step S700, the bit pattern serving as a parameter generated by the scramble parameter generation block 500 is set to cycle variation control HW. Here, the cycle variation control HW (control block) includes the variable frequency divider 601 and the transmission cycle generation block 602 shown in FIG. 16. Accordingly, in Step S103, the communication data generated by the processor CPU is transmitted after the cycle thereof is caused to vary as described in FIG. 16 and FIGS. 17A-17D.

FIG. 18B is different from FIG. 14B in that Step S600 is changed to Step S800. In Step S800, the reception data is set to frequency variation detection HW, and cycle variation information is accumulated into the bit pattern accumulation buffer 308 as bit information. Here, the frequency variation detection HW (detection block) includes the reception data cycle detection block 603, the reception data cycle measurement block 605, the reference cycle generation block 604, and the comparison block 606 shown in FIG. 16. Accordingly, the logical value of the data (bit) in the parameter is extracted from the cycle variation, and is accumulated into the bit pattern accumulation buffer 308 as described in FIG. 16 and FIGS. 17A-17D.

Next, an operation of the data communications in the scramble communication period Tss will be described. FIG. 19A is different from FIG. 15A in that Step S511 is changed to Step S710. Further, FIG. 19B is different from FIG. 15B in that Step S610 is changed to Step S810. Even in the embodiment, the scramble pattern is updated even in the scramble communication period Tss as similar to the first embodiment. Therefore, Step S710 similar to Step S700 shown in FIG. 18A is executed even in FIG. 19A, and Step S810 similar to Step S800 shown in FIG. 18B is executed in FIG. 19B.

The safety of the secret data can be further improved by generating the parameter to update the scramble pattern accumulated in the bit pattern accumulation buffer 308 even in the scramble communication period Tss.

In the embodiment, the logical value of the bit configuring the scramble pattern does not directly appear as the logical value of the bit in the communication data transmitted and received between the semiconductor devices. Therefore, it is possible to reduce the possibility that the scramble pattern is specified by a third party.

Fifth Embodiment

In a fifth embodiment, provided is a configuration capable of confirming whether or not an opposite device is a proper device between devices that perform data communications. Even in the fifth embodiment, a case in which the first semiconductor device 101_1 and the second semiconductor device 101_2 are used as devices that perform data communications will be exemplified. In the exemplification, it is assumed that each of the first semiconductor device 101_1 and the second semiconductor device 101_2 is provided with the configuration of FIG. 3 described in the first embodiment.

Figure 20:
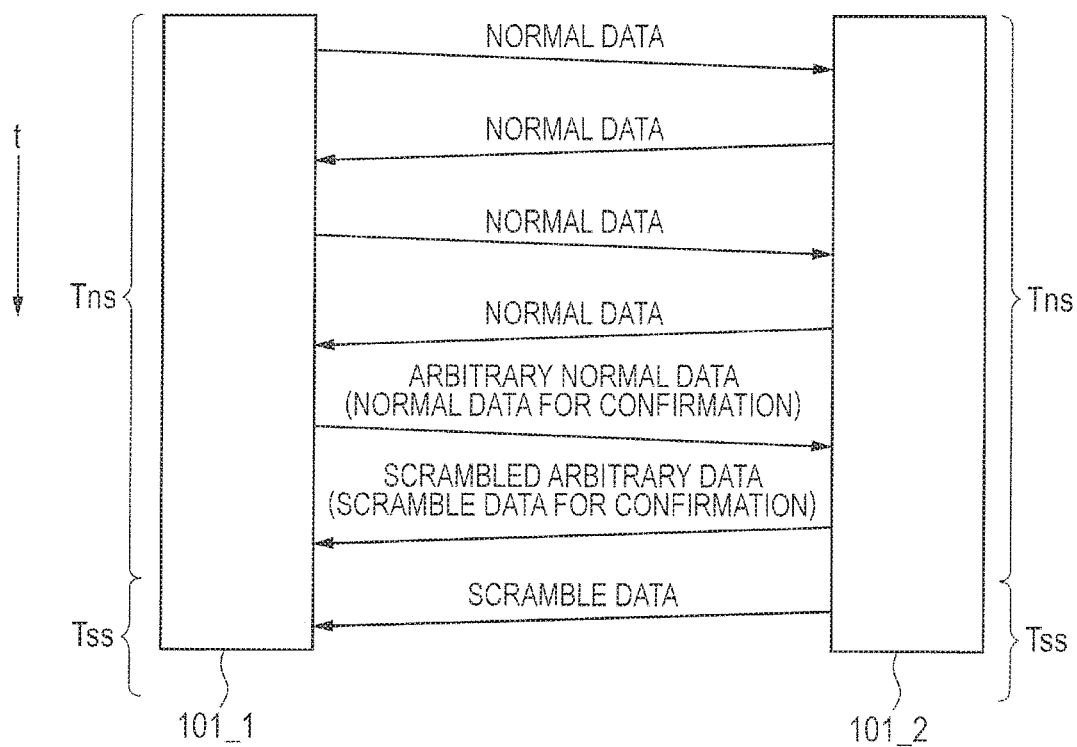
FIG. 20 is an explanation diagram for explaining data communications in a system according to a fifth embodiment.

FIG. 20 is an explanation diagram for explaining data communications in a system according to the fifth embodiment. The first semiconductor device 101_1 and the second semiconductor device 101_2 mutually transmit and receive normal data a plurality of times in the unscramble communication period Tns. The bit pattern accumulation buffers 308 of the first semiconductor devices 101_1 and the second semiconductor device 101_2 accumulate the scramble patterns by transmitting and receiving the data a plurality of times.

In the embodiment, the first semiconductor device 101_1 transmits arbitrary normal data (hereinafter, referred to as normal data for confirmation) to the second semiconductor device 101_2 before shifting from the unscramble communication period Tns to the scramble communication period Tss. The normal data for confirmation is data irrelevant to the normal data transmitted and received so far in the unscramble communication period Tns. For example, the first semiconductor device 101_1 transmits a random number having 64 bits or larger as the normal data for confirmation. Further, the first semiconductor device 101_1 stores the transmitted normal data for confirmation.

When the unscramble communication period Tns is shifted to the scramble communication period Tss, the second semiconductor device 101_2 scrambles the normal data for confirmation using the scramble pattern generated on the basis of the normal data transmitted and received in the unscramble communication period Tns. The second semiconductor device 101_2 transmits the scramble data for confirmation generated by scrambling to the first semiconductor device 101_1 in the scramble communication period Tss.

When receiving the scramble data for confirmation in the scramble communication period Tss, the first semiconductor device 101_1 descrambles the scramble data for confirmation using the scramble pattern accumulated in the bit pattern accumulation buffer 308. The first semiconductor device 101_1 confirms whether or not the second semiconductor device 101_2 is a proper semiconductor device by comparing the normal data generated by descrambling with the stored normal data for confirmation. For example, in the case where a malicious third party uses a semiconductor device different from the second semiconductor device 101_2, the normal data generated by descrambling the scramble data for confirmation does not match the normal data for confirmation, and it is possible to confirm that the semiconductor device is an improper semiconductor device.

<Confirmation Operation in System>

Next, a confirmation operation executed in the system according to the fifth embodiment will be described using flowcharts. FIGS. 21A-21B are flowcharts each showing a confirmation operation in the system according to the fifth embodiment. FIG. 21A shows an operation of the semiconductor device (first semiconductor device 101_1) that performs the confirmation operation, and FIG. 21B shows an operation of the semiconductor device (second semiconductor device 101_2) to be confirmed.

In Step S900, the first semiconductor device 101_1 transmits and receives the normal data a plurality of times, and accumulates the scramble pattern into the bit pattern accumulation buffer 308 as described in the first embodiment. In Step S901, for example, the processor CPU in the first semiconductor device 101_1 generates the normal data for confirmation, and transmits the normal data for confirmation in Step S902. At this time, the generated normal data for confirmation is stored in the semiconductor device 101_1.

In Step S1000, the second semiconductor device 101_2 transmits and receives the normal data a plurality of times, and accumulates the scramble pattern into the bit pattern accumulation buffer 308.

In Step S1001, the second semiconductor device 101_2 receives the normal data for confirmation, and scrambles the normal data for confirmation using the scramble pattern accumulated in the bit pattern accumulation buffer 308 in Step S1002. The scramble data for confirmation generated by scrambling is transmitted to the first semiconductor device 101_1 in Step S1003. Accordingly, the second semiconductor device 101_2 completes the confirmation operation (Step S1004). It should be noted that Step S1001 and the steps before Step S1001 are executed in the unscramble communication period Tns, and Step S1002 and the steps after Step S1002 are executed in the scramble communication period Tss.

In Step S903, the first semiconductor device 101_1 receives the scramble data for confirmation transmitted in Step S1003, and descrambles the scramble data for confirmation using the scramble pattern accumulated in the bit pattern accumulation buffer 308 in Step S904.

Next, the first semiconductor device 101_1 determines in Step S905 whether or not the normal data generated by descrambling, namely, the result obtained by descrambling is the same as the stored normal data for confirmation. If the result is the same as the stored data, the first semiconductor device 101_1 thereafter executes Step S906. If the result does not match the stored data, the first semiconductor device 101_1 thereafter executes Step S908.

In Step S906, it is determined that the second semiconductor device 101_2 is a proper semiconductor device, and thereafter the confirmation operation is completed in Step S907. In the scramble communication period Tss thereafter, the first semiconductor device 101_1 executes secret data communications with the second semiconductor device 101_2.

On the other hand, it is determined in Step S908 that the second semiconductor device 101_2 is an improper semiconductor device, and thereafter Step S909 is executed. In Step S909, the first semiconductor device 101_1 determines that the second semiconductor device 101_2 is an illegal semiconductor device, and executes a process to deal with the illegality.

If the second semiconductor device 101_2 is a proper semiconductor device, the scramble pattern accumulated in the bit pattern accumulation buffer 308 in Step S1000 matches the scramble pattern accumulated in the bit pattern accumulation buffer 308 by the first semiconductor device 101_1 in Step S900. Therefore, it is determined as a match in Step S905. On the contrary, in the case where the second semiconductor device 101_2 is an improper semiconductor device, the normal data for confirmation is scrambled in Step S1002 using, for example, the scramble pattern different from that accumulated in the bit pattern accumulation buffer 308 in the first semiconductor device 101_1. Therefore, it is determined as a mismatch in Step S905.

The first embodiment describes an example in which a specific value (a bit string corresponding to SUCCESS and FAIL) is set between the first semiconductor device 101_1 and the second semiconductor device 101_2 to confirm data falsification. In this case, it is required to set the specific value in advance between the semiconductor devices. Further, since data falsification can be confirmed only when the specific value is transmitted, the act of a malicious third party cannot be confirmed. On the contrary, it is not required to set the specific value in advance between the semiconductor devices in the fifth embodiment. Further, it is possible to confirm whether or not the opposite semiconductor device is proper before starting the transmission and reception of the scramble data. Namely, an improper semiconductor device can be specified in advance, and a malicious third party can be excluded.

The above-described embodiments can be combined with each other, and it is possible to make it more difficult to specify the scramble pattern by a malicious third party by combining the embodiments with each other. For example, in the case where the third embodiment is combined with the first, second, or fifth embodiment, bit information of the predetermined bit positions of the bit pattern from the voltage comparison block 503 and the bit pattern from the scramble parameter generation block 500 may be accumulated into the bit pattern accumulation buffer 308 in accordance with the rule set between the first semiconductor device 101_1 and the second semiconductor device 101_2. Likewise, in the case where the fourth embodiment is combined with the first, second, or fifth embodiment, bit information of the predetermined bit positions of the bit pattern from the comparison block 606 and the bit pattern from the scramble parameter generation block 500 may be accumulated into the bit pattern accumulation buffer 308 in accordance with the rule set between the first semiconductor device 101_1 and the second semiconductor device 101_2.

The invention achieved by the inventors has been concretely described above on the basis of the embodiments. However, it is obvious that the present invention is not limited to the embodiments, and can be variously changed without departing from the gist thereof. For example, as an example shown in the above-described embodiments, the processor CPU configures the scramble unit and the descramble unit. However, the present invention is not limited to this, and dedicated HW may be provided. In this case, the dedicated HW configures the scramble unit and the descramble unit, and scrambles or descrambles data using the scramble pattern. In this case, as the dedicated HW, dedicated HW corresponding to the scramble unit and dedicated HW corresponding to the descramble unit may be provided, or common HW may be provided.

What is claimed is:

1. A semiconductor device that transmits and receives data, the semiconductor device comprising:
   a processor that performs functions of:
      a first extraction block that extracts first data from transmission data in accordance with a first rule;
      a second extraction block that extracts second data from reception data in accordance with a second rule;

a buffer that accumulates the first data and the second data and supplies the combination of the first data and the second data as a scramble pattern; and a scramble unit that receives the scramble pattern from the buffer and scrambles data using the scramble pattern, wherein the buffer accumulates the first data extracted by the first extraction block every time the transmission data is transmitted and accumulates the second data extracted by the second extraction block every time the reception data is received, and wherein a combination of a plurality of pieces of first data and a plurality of pieces of second data is supplied to the scramble unit as the scramble pattern.

2. The semiconductor device according to claim 1,
wherein the buffer includes 1) a queue circuit to which the pieces of first data and the pieces of second data are sequentially supplied and 2) a register that fetches data accumulated in the queue circuit when the transmission data is transmitted, and wherein the data fetched to the register is supplied to the scramble unit as the scramble pattern.

3. The semiconductor device according to claim 2,
wherein the first extraction block extracts data at a predetermined bit position in the transmission data as the first data in accordance with the first rule, and wherein the second extraction block extracts data at a predetermined bit position in the reception data as the second data in accordance with the second rule.

4. The semiconductor device according to claim 1,
wherein a sequence number is added to the transmission data, wherein the sequence number changes every time the transmission data is transmitted, wherein the first extraction block extracts the first data from data obtained by scrambling the transmission data using a hash function, and wherein the second extraction block extracts the second data from data obtained by scrambling reception data to which the sequence number is given using a hash function.

5. The semiconductor device according to claim 1, wherein the processor further performs functions of a descramble unit that descrambles the reception data using the scramble pattern.

6. A system comprising:
a first semiconductor device; and
a second semiconductor device,
wherein data is transmitted and received between the first semiconductor device and the second semiconductor device, wherein each of the first semiconductor device and the second semiconductor device includes:
a processor that performs functions of:
a first extraction block extracts first data from transmission data in accordance with a first rule set between the first semiconductor device and the second semiconductor device;
a second extraction block extracts second data from reception data in accordance with a second rule set between the first semiconductor device and the second semiconductor device;
a buffer that accumulates the first data and the second data;
a scramble unit that scrambles data to be transmitted using a scramble pattern; and a descramble unit that descrambles the reception data using the scramble pattern, wherein the combination of the first data and the second data is supplied from the buffer to the scramble unit and the descramble unit as the scramble pattern, wherein a data communication period in which data is transmitted and received between the first semiconductor device and the second semiconductor device has a scramble communication period in which transmission data scrambled using the scramble pattern is transmitted and received, and an unscramble communication period prior to the scramble communication period in which transmission data that is not scrambled using the scramble pattern is transmitted and received, wherein the first extraction block extracts, as the first data, data at a predetermined bit position in the transmission data in accordance with the first rule every time the transmission data is transmitted in the unscramble communication period, wherein the second extraction block extracts, as the second data, data at a predetermined bit position in the reception data in accordance with the second rule every time the reception data is received in the unscramble communication period, and wherein a plurality of pieces of first data extracted and a plurality of pieces of second data extracted during the unscrambled communication period are accumulated in the buffer.

7. The system according to claim 6,
wherein the second semiconductor device scrambles data preliminarily set between the first semiconductor device and the second semiconductor device using the scramble pattern and transmits the data to the first semiconductor device as transmission data, and wherein the first semiconductor device descrambles reception data using the scramble pattern to confirm whether or not the descrambled reception data corresponds to the preliminarily set data.

8. The system according to claim 6,
wherein a sequence number is added to the transmission data, wherein the sequence number changes every time the transmission data is transmitted, wherein the first extraction block extracts the first data from data obtained by scrambling the transmission data using a hash function, and wherein the second extraction block extracts the second data from data obtained by scrambling reception data to which the sequence number is given using a hash function.

9. The system according to claim 6,
wherein the first semiconductor device transmits data for confirmation to the second semiconductor device in the unscramble communication period, wherein the second semiconductor device scrambles the data for confirmation using the scramble pattern to be transmitted to the first semiconductor device, and wherein the first semiconductor device descrambles scramble data transmitted from the second semiconductor device using the scramble pattern to confirm the descrambled data with the data for confirmation.

10. The system according to claim 6,
wherein the first extraction block extracts, as the first data, data at a predetermined bit position in the transmission data in accordance with the first rule every time the transmission data is transmitted in the scramble communication period, wherein the second extraction block extracts, as the second data, data at a predetermined bit position in the reception data in accordance with the second rule every time the reception data is received in the scramble communication period, and wherein a plurality of pieces of first data extracted and a plurality of pieces of second data extracted during the scramble communication period are accumulated in the buffer.

11. The system according to claim 6, wherein the scramble unit and the descramble unit are configured using a processor.

* * * * *